(12) United States Patent
Abdul Rasheed et al.

(10) Patent No.: US 11,782,944 B2
(45) Date of Patent: Oct. 10, 2023

(54) PROVIDING DATA VIEWS FROM A TIME-SERIES DATA LAKE TO A DATA WAREHOUSING SYSTEM

(71) Applicant: Clumio, Inc., Sunnyvale, CA (US)

(72) Inventors: Abdul Jabbar Abdul Rasheed, San Jose, CA (US); Woonho Jung, Cupertino, CA (US); Xia Hua, Mountain View, CA (US); Douglas Qian, Mountain View, CA (US); Rajeev Kumar, Sunnyvale, CA (US); Lawrence Chang, San Jose, CA (US); Karan Dhabalia, Mountain View, CA (US); John Stewart, San Jose, CA (US); Rolland Miller, Olathe, KS (US)

(73) Assignee: Clumio, Inc., Sunnyvale, CA (US)

( * ) Notice: Subject to any disclaimer, the term of this patent is extended or adjusted under 35 U.S.C. 154(b) by 0 days.

(21) Appl. No.: 17/187,353

(22) Filed: Feb. 26, 2021

(65) Prior Publication Data

US 2021/0271568 A1    Sep. 2, 2021

Related U.S. Application Data

(60) Provisional application No. 62/982,970, filed on Feb. 28, 2020.

(51) Int. Cl.
*G06F 16/25*     (2019.01)
*G06F 16/245*    (2019.01)
(Continued)

(52) U.S. Cl.
CPC ........ *G06F 16/254* (2019.01); *G06F 11/1435* (2013.01); *G06F 11/1451* (2013.01);
(Continued)

(58) Field of Classification Search
CPC .... G06F 16/245; G06F 16/254; G06F 16/903; G06F 16/907; G06F 16/95;
(Continued)

(56) References Cited

U.S. PATENT DOCUMENTS 7,634,511 B1 * 12/2009 Freiheit ............... G06F 11/1458
707/999.102
7,921,330 B2    4/2011 Riemers
(Continued)

FOREIGN PATENT DOCUMENTS

EP        3182284 A1    6/2017
WO    2019/157399 A1    8/2019

OTHER PUBLICATIONS

International Search Repor and Written Opinion in PCT Appl. No. PCT/US2021/020054 dated Jun. 10, 2021, 10 pages.
(Continued)

*Primary Examiner* — Alicia M Willoughby
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to providing data views from a time-series data lake to a data warehousing system. In various embodiments, the disclosed techniques include providing, by a cloud-based service, a data lake service that maintains a time-series data lake storing a time-series representation of data from a plurality of data sources associated with a first organization. In some embodiments, the cloud-based service may receive additional backup data, including a first backup image of a first data source, associated with the first organization as part of a backup operation. The cloud-based service may then store a logical backup of the first data source in the data lake and, in response to a query from a data warehousing system, the cloud-based service may retrieve a particular view of the
(Continued)

backup data from the data lake and provide it to the data warehousing system.

13 Claims, 14 Drawing Sheets

(51) Int. Cl.
*G06F 16/2455* (2019.01)
*G06F 11/14* (2006.01)
*G06F 16/23* (2019.01)

(52) U.S. Cl.
CPC ...... *G06F 11/1461* (2013.01); *G06F 11/1464* (2013.01); *G06F 11/1469* (2013.01); *G06F 16/2379* (2019.01); *G06F 16/245* (2019.01); *G06F 16/2455* (2019.01); *G06F 2201/80* (2013.01); *G06F 2201/84* (2013.01)

(58) Field of Classification Search
CPC ............. G06F 16/9035; G06F 11/1435; G06F 11/1451; G06F 11/1461; G06F 11/1464; G06F 11/1469; G06F 16/2379; G06F 16/2455; G06F 2201/80; G06F 2201/84; G06F 16/901; G06F 16/93; H04L 67/1097
See application file for complete search history.

(56) References Cited

U.S. PATENT DOCUMENTS

| | | | |
|---|---|---|---|
| 8,473,520 B1* | 6/2013 | Tsang | G06F 16/90328 707/791 |
| 8,505,027 B2 | 8/2013 | Warner et al. | |
| 8,731,971 B1 | 5/2014 | O'Neill et al. | |
| 8,832,331 B2 | 9/2014 | Co | |
| 8,972,354 B1 | 3/2015 | Telang | |
| 9,456,045 B1 | 9/2016 | Dickens et al. | |
| 9,753,935 B1* | 9/2017 | Tobin | G06F 16/248 |
| 10,289,633 B1 | 5/2019 | Reiner et al. | |
| 10,296,501 B1 | 5/2019 | Todd et al. | |
| 10,838,962 B2 | 11/2020 | Bansal et al. | |
| 11,030,240 B1 | 6/2021 | Janakiraman et al. | |
| 11,042,503 B1* | 6/2021 | Vig | G06F 11/1451 |
| 11,074,261 B1* | 7/2021 | Pandis | G06F 16/9535 |
| 2005/0076042 A1 | 4/2005 | Stakutis et al. | |
| 2005/0207579 A1 | 9/2005 | Maino et al. | |
| 2006/0072626 A1 | 4/2006 | Hands et al. | |
| 2009/0077138 A1 | 3/2009 | Davis et al. | |
| 2009/0165026 A1 | 6/2009 | Paknad et al. | |
| 2010/0042583 A1 | 2/2010 | Gervais et al. | |
| 2010/0262836 A1 | 10/2010 | Peukert et al. | |
| 2010/0332453 A1 | 12/2010 | Prahlad et al. | |
| 2011/0093471 A1* | 4/2011 | Brockway | G06F 21/10 707/E17.083 |
| 2012/0215743 A1 | 8/2012 | Triantafillos et al. | |
| 2013/0066838 A1* | 3/2013 | Singla | G06F 16/14 707/674 |
| 2013/0086104 A1* | 4/2013 | Morrison | G06F 16/211 707/769 |
| 2015/0242417 A1* | 8/2015 | Spurlock | G06F 16/2228 707/694 |
| 2015/0261768 A1 | 9/2015 | Ahn et al. | |
| 2015/0278394 A1 | 10/2015 | Li et al. | |
| 2015/0356094 A1 | 12/2015 | Gorelik | |
| 2016/0034525 A1 | 2/2016 | Neels et al. | |
| 2016/0034550 A1 | 2/2016 | Ostler et al. | |
| 2016/0065498 A1 | 3/2016 | Harper et al. | |
| 2016/0127465 A1 | 5/2016 | Barstow et al. | |
| 2016/0321331 A1 | 11/2016 | Uchiumi et al. | |
| 2017/0308595 A1 | 10/2017 | Dey et al. | |
| 2017/0322959 A1 | 11/2017 | Tidwell et al. | |
| 2018/0082036 A1 | 3/2018 | Hanrahan et al. | |
| 2018/0096001 A1 | 4/2018 | Soza | |
| 2018/0173596 A1* | 6/2018 | Petracca | G06F 11/1451 |
| 2018/0246886 A1 | 8/2018 | Dragomirescu et al. | |
| 2018/0253477 A1 | 9/2018 | Schoueri et al. | |
| 2018/0276256 A1* | 9/2018 | Sarkar | G06K 9/6221 |
| 2018/0356792 A1* | 12/2018 | Chao | G05B 19/406 |
| 2018/0373781 A1 | 12/2018 | Palrecha | |
| 2019/0005091 A1 | 1/2019 | Iruku et al. | |
| 2019/0057218 A1 | 2/2019 | Bhaskara et al. | |
| 2019/0155938 A1 | 5/2019 | Kudriavtsev et al. | |
| 2019/0163679 A1* | 5/2019 | Srinivasa | G06F 16/2465 |
| 2020/0013501 A1 | 1/2020 | Page et al. | |
| 2020/0019470 A1 | 1/2020 | Wolfson et al. | |
| 2020/0065521 A1 | 2/2020 | Durvasula et al. | |
| 2020/0117552 A1* | 4/2020 | Shemer | G06F 16/27 |
| 2020/0117737 A1* | 4/2020 | Gopalakrishnan | G06F 16/9535 |
| 2020/0125988 A1 | 4/2020 | Garvey et al. | |
| 2020/0167323 A1* | 5/2020 | Swamy | G06F 16/256 |
| 2020/0174966 A1 | 6/2020 | Szczepanik et al. | |
| 2020/0252264 A1 | 8/2020 | Arora et al. | |
| 2020/0272353 A1 | 8/2020 | Ainscow et al. | |
| 2020/0380155 A1 | 12/2020 | Sarferaz | |
| 2020/0389373 A1 | 12/2020 | Barton et al. | |
| 2020/0394110 A1* | 12/2020 | Ramohalli Gopala Rao | G06F 11/2064 |
| 2021/0105274 A1* | 4/2021 | Bender | H04L 63/102 |
| 2021/0141694 A1* | 5/2021 | Cope | G06F 11/2094 |
| 2021/0149854 A1* | 5/2021 | Barde | H04L 63/08 |
| 2021/0158933 A1 | 5/2021 | Frosch et al. | |
| 2021/0232603 A1 | 7/2021 | Sundaram et al. | |
| 2021/0232604 A1 | 7/2021 | Sundaram et al. | |
| 2021/0233664 A1 | 7/2021 | Colley et al. | |

OTHER PUBLICATIONS

International Search Report and Written Opinion in PCT Appl. No. PCT/US2021/020063 dated Jun. 10, 2021, 10 pages.
Announcing Amazon Relational Database Service (RDS) Snapshot Export to S3, posted on Jan. 23, 2020; https://aws.amazon.com/about-aws/whats-new/2020/01/announcing-amazon-relational-database-service-snapshot-export-to-s3/; 2 pages. [Retrieved Feb. 10, 2020].
Apache Parquet, Apache Software Foundation, https://parquet.apache.org/documentation/latest/; Copyright 2018, 6 pages. [Retrieved Jan. 30, 2020].
What is a data lake?; 2020; https://aws.amazon.com/big-data/datalakes-and-analytics/what-is-a-data-lake/, 10 pages. [Retrieved Feb. 3, 2020].
Data Lake, Microsoft Azure; https://azure.microsoft.com/en-us/solutions/data-lake/; 4 pages. [Retrieved Feb. 3, 2020].
Extract, transform, load; https://en.wikipedia.org/w/index.php?title=Extract,_transform,_load&oldid=937456974; page was last edited on Jan. 25, 2020, 9 pages.
John de Koning, "Data Lake or Data Swamp? Keeping the Data Lake from Becoming a Data Swamp," KSG Solutions, 2017, 16 pages.

* cited by examiner

400

┌─────────────────────────────────────────────────────────────────────┐
│ Receive backup data for an organization as part of one or more backup operations, where the │
│ backup data includes a first backup image, of a first data source, that was generated at a first │
│ point in time │
│ 402 │
└─────────────────────────────────────────────────────────────────────┘
                                      ↓
┌─────────────────────────────────────────────────────────────────────┐
│ Create a logical backup of the first data source using the first backup image │
│ 404 │
└─────────────────────────────────────────────────────────────────────┘
                                      ↓
┌─────────────────────────────────────────────────────────────────────┐
│ Generate metadata associated with the first data source │
│ 406 │
└─────────────────────────────────────────────────────────────────────┘
                                      ↓
┌─────────────────────────────────────────────────────────────────────┐
│ Store the logical backup and the metadata in a time-series data lake associated with the │
│ organization │
│ 408 │
└─────────────────────────────────────────────────────────────────────┘

```
┌─────────────────────────────────────────────────────────────────────────┐
│ Provide a data lake service that maintains data for a plurality of       │
│ organizations, where, for a first organization, the data lake service    │
│ maintains a time-series data lake that stores a time-series              │
│ representation of data associated with the first organization            │
│                                 452                                      │
└─────────────────────────────────────────────────────────────────────────┘
                                    │
                                    ▼
┌─────────────────────────────────────────────────────────────────────────┐
│ Receive backup data from a plurality of data sources associated with the │
│ first organization                                                       │
│                                 454                                      │
└─────────────────────────────────────────────────────────────────────────┘
                                    │
                                    ▼
┌─────────────────────────────────────────────────────────────────────────┐
│ Generate metadata associated with the backup data, where, for a given    │
│ data element of the backup data, corresponding metadata includes source  │
│ information identifying a particular one of the plurality of data        │
│ sources from which the given data element of the backup data originated  │
│                                 456                                      │
└─────────────────────────────────────────────────────────────────────────┘
                                    │
                                    ▼
┌─────────────────────────────────────────────────────────────────────────┐
│ Store the backup data and the metadata in the time-series data lake      │
│                                 458                                      │
└─────────────────────────────────────────────────────────────────────────┘
```

```
┌─────────────────────────────────────────────────────────────────────────────┐
│ Provide a data lake service that maintains data for a plurality of          │
│ organizations, where, for a first one of the plurality of organizations,    │
│ the data lake service maintains a time-series data lake that stores a       │
│ time-series representation of backup data associated with the first         │
│ organization                                                                │
│                                    502                                      │
└─────────────────────────────────────────────────────────────────────────────┘
                                      ↓
┌─────────────────────────────────────────────────────────────────────────────┐
│ Receive, from a requesting entity, a request for data associated with the   │
│ first organization                                                          │
│                                    504                                      │
└─────────────────────────────────────────────────────────────────────────────┘
                                      ↓
┌─────────────────────────────────────────────────────────────────────────────┐
│ Based on one or more search criteria included in the request, retrieve a    │
│ particular view of the backup data stored in the time-series data lake      │
│                                    506                                      │
└─────────────────────────────────────────────────────────────────────────────┘
                                      ↓
┌─────────────────────────────────────────────────────────────────────────────┐
│ Provide the particular view of the backup data to the requesting entity     │
│                                    508                                      │
└─────────────────────────────────────────────────────────────────────────────┘
```

```
┌─────────────────────────────────────────────────────────────────────┐
│ Provide a data lake service that maintains, for a first organization,│
│ a time-series data lake storing a time-series representation of      │
│ backup data from a plurality of data sources associated with the     │
│ first organization                                                   │
│ 702                                                                  │
└─────────────────────────────────────────────────────────────────────┘
                                    ↓
┌─────────────────────────────────────────────────────────────────────┐
│ Receive additional backup data associated with the first organization│
│ as part of one or more backup operations, where the additional backup│
│ data includes a first backup image, of a first data source, that was │
│ generated at a first point in time                                   │
│ 704                                                                  │
└─────────────────────────────────────────────────────────────────────┘
                                    ↓
┌─────────────────────────────────────────────────────────────────────┐
│ Create a first logical backup of the first data source using the     │
│ first backup image                                                   │
│ 706                                                                  │
└─────────────────────────────────────────────────────────────────────┘
                                    ↓
┌─────────────────────────────────────────────────────────────────────┐
│ Store the first logical backup, and corresponding metadata, in the   │
│ time-series data lake as part of the backup data                     │
│ 708                                                                  │
└─────────────────────────────────────────────────────────────────────┘
                                    ↓
┌─────────────────────────────────────────────────────────────────────┐
│ Receive, from a data warehousing system, a first query specifying a  │
│ particular data view of the backup data associated with the first    │
│ organization                                                         │
│ 710                                                                  │
└─────────────────────────────────────────────────────────────────────┘
                                    ↓
┌─────────────────────────────────────────────────────────────────────┐
│ Retrieve the particular data view from the time-series data lake     │
│ based on the first query                                             │
│ 712                                                                  │
└─────────────────────────────────────────────────────────────────────┘
                                    ↓
┌─────────────────────────────────────────────────────────────────────┐
│ Provide the particular data view to the data warehousing system      │
│ 714                                                                  │
└─────────────────────────────────────────────────────────────────────┘
```

```
┌─────────────────────────────────────────────────────────────────────┐
│ Maintain a data lake that includes, for an organization, a time-series representation of data from │
│                          a plurality of data sources                │
│                                    1102                             │
└─────────────────────────────────────────────────────────────────────┘
                                    │
                                    ▼
┌─────────────────────────────────────────────────────────────────────┐
│ Receive a request to modify (e.g., delete, anonymize, mask, etc.) data associated with a user of │
│                              the organization                       │
│                                    1104                             │
└─────────────────────────────────────────────────────────────────────┘
                                    │
                                    ▼
┌─────────────────────────────────────────────────────────────────────┐
│ Search the data lake, using the one or more criteria, to identify a subset of data associated with │
│                              the first user                         │
│                                    1106                             │
└─────────────────────────────────────────────────────────────────────┘
                                    │
                                    ▼
┌─────────────────────────────────────────────────────────────────────┐
│ Perform one or more modifications (e.g., delete, mask, or anonymize the data) on the subset of │
│                          data in the data lake                      │
│                                    1108                             │
└─────────────────────────────────────────────────────────────────────┘
```

FIG. 11

PROVIDING DATA VIEWS FROM A TIME-SERIES DATA LAKE TO A DATA WAREHOUSING SYSTEM

CROSS-REFERENCE TO RELATED APPLICATIONS

This application claims the benefit of U.S. Provisional Application No. 62/982,970 entitled "Time-Series Data Lake," filed on Feb. 28, 2020, which is hereby incorporated by reference as if entirely set forth herein. This application is also related to the following U.S. Applications filed on Feb. 26, 2021: U.S. application Ser. No. 17/187,286 now issued as U.S. Pat. No. 11,687,548, U.S. application Ser. No. 17/187,300, U.S. application Ser. No. 17/187,359, and U.S. application Ser. No. 17/187,365 now issued as U.S. Pat. No. 11,455,316, Each of the above-referenced applications is hereby incorporated by reference as if entirely set forth herein.

BACKGROUND

Technical Field

The present disclosure relates generally to data storage systems, and more particularly to providing data views from a time-series data lake to a data warehousing system.

Description of the Related Art

Organizations often utilize large amounts of data to support business applications and services. In some instances, much of an organization's data may reside in various different data stores, such as structured or semi-structured databases, collections of electronic files, data from messaging systems, etc. Further, in many cases, an organization will maintain its data in "data silos" in which some of the organization's data is isolated from, and thus not accessible to, other parts of the organization's system. The data stores utilized by an organization are typically used for online transaction processing, for example to store and retrieve data as-needed to support the services the organization provides, but are typically not effective for online analytical processing ("OLAP") operations. For example, it may take an extended time period (e.g., hours or days) to execute an OLAP query using the data stores typically utilized by an organization (e.g., relational databases). Accordingly, when an organization needs to perform data analytics across such data silos, the organization typically utilizes a separate data warehousing system. To utilize a data warehouse, organizations traditionally extract data from their various data stores, transform the format and structure of the data as needed to fit the target data warehouse, and load that transformed data into the data warehouse. This process is both time-consuming and computationally expensive. Further, since this process results in a point-in-time view of the organization's data, this "ETL" process must be repeated each time the organization wishes to obtain a different view of its data, resulting in significant expense in time and computational resources.

BRIEF DESCRIPTION OF THE DRAWINGS

FIGS. 4A-4B are flow diagrams illustrating example methods for storing backup data, along with one or more items of metadata, in a time-series data lake, according to some embodiments.

FIG. 5 is a flow diagram illustrating an example method for retrieving data from a time-series data lake, according to some embodiments.

FIG. 7 is a flow diagram illustrating an example method for providing selected data views, from a time-series data lake, to a data warehousing system, according to some embodiments.

FIG. 11 is a flow diagram illustrating an example method for modifying data in a time-series data lake, according to some embodiments.

DETAILED DESCRIPTION

Figure 1:
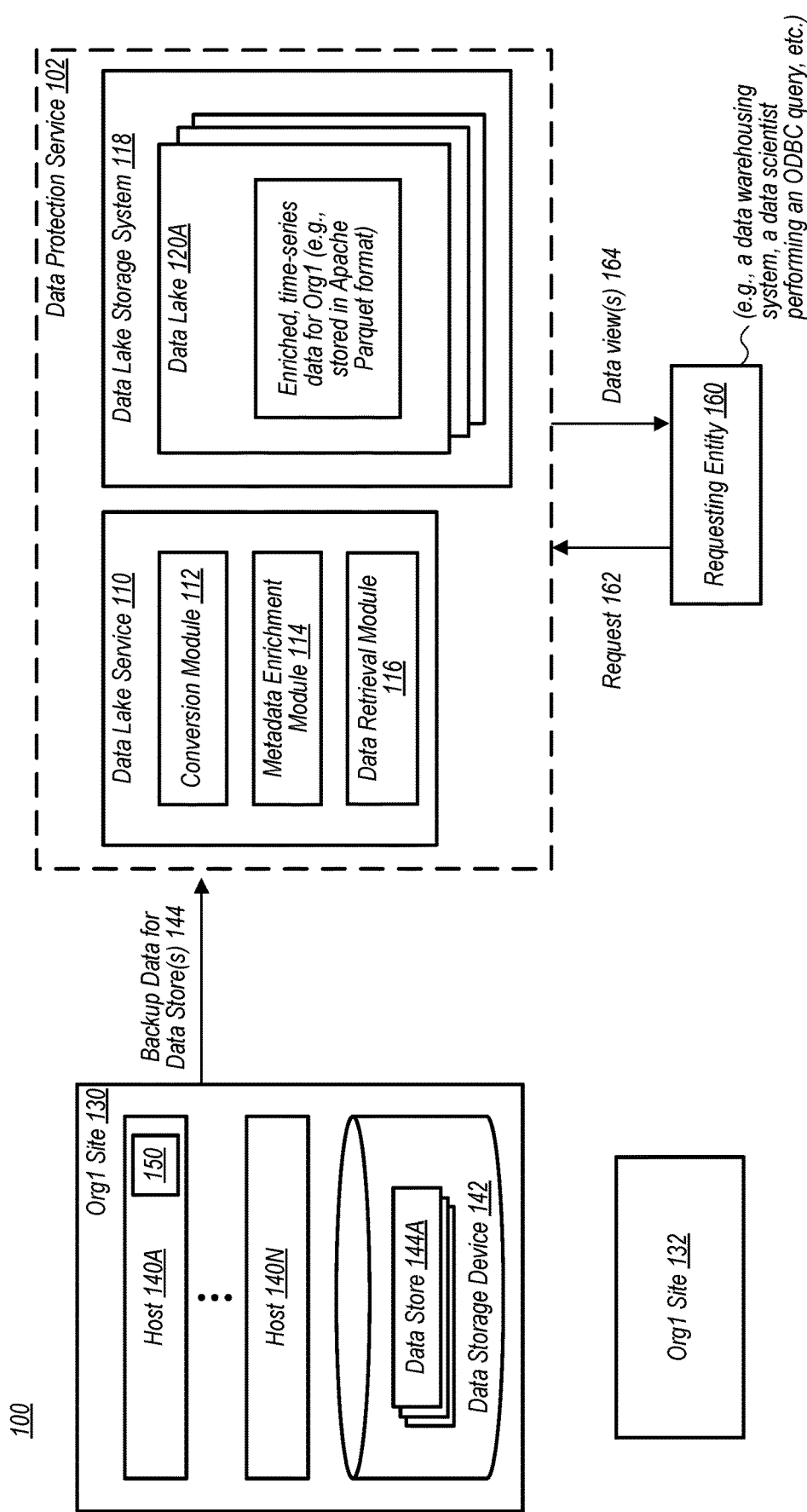
FIG. 1 is a block diagram illustrating an example data protection service that includes a data lake service, according to some embodiments.

Organizations often utilize large amounts of data, for example to support business applications and services that the organizations run from their on-site data centers or using public cloud service providers. In some instances, much of the data for an enterprise organization may reside in various data stores. As used herein, the term "data store" refers to an organized collection of data. In various embodiments, a data store may be a database, such as a structured or semi-structured database, a collection of electronic files, data from messaging systems such as e-mail systems or chat-based systems, data warehouses, social media feeds, file servers, object-based data storage systems, etc. Within a given organization's system, there could be 10s to 1000s of data stores, potentially utilizing multiple data storage formats (e.g., Oracle™ databases, Amazon™ Relational Data Base Service (RDS) databases, Amazon™ DynamoDB databases, Amazon™ Neptune databases, Amazon™ Aurora databases, Microsoft™ Azure SQL databases, MongoDB™ databases, IBM™ db2 databases, Hadoop™ Distributed File Systems, Microsoft™ Exchange e-mails, Slack™ messages, Microsoft™ 365 Exchange, Microsoft™ 365 SharePoint, Microsoft™ 365 OneDrive, Twitter™ feeds, Facebook™ posts, Google™ Suite Gmail, Google™ Suite Drive, Dropbox™ files, Box™ files, etc.).

The data stores utilized by an organization may be optimized for online transaction processing ("OLTP"), storing and retrieving data as needed to support the business application services the organization provides. An organization will typically perform data backup operations to preserve backup copies of its data, both for data protection and to comply with applicable regulatory requirements. These backup operations may be performed periodically. For example, in some instances, an organization may backup the data for one or more of its data stores every day, every week, or at any other suitable time interval, as desired. Various techniques for utilizing a cloud-based data protection and recovery service to perform data backup operations and other related operations are described in detail in U.S. application Ser. No. 16/857,007 entitled "Cloud Based Data Protection Service" (hereinafter the "'007 Application"), which was filed on Apr. 23, 2020 and is hereby incorporated by reference as if entirely set forth herein.

Though effective for OLTP, the data stores used by organizations are typically not optimized for online analytical processing ("OLAP") operations, which may be performed to gain insight based on the data within the system. For example, common data stores used for OLTP operations (such as Oracle™ databases, etc.) are not designed for the complex queries typically utilized for OLAP operations, and it can take an extended period of time (e.g., hours, days, etc.) and significant processing resources to execute an OLAP query on an OLTP data store. Additionally, since an organization's data is commonly maintained in "data silos" (in which some of the organization's data is isolated from, and thus not accessible to, other parts of the organization's systems), the data needed for a given analytical job may be maintained across various, disparate data stores. Accordingly, when an organization needs to perform data analytics across such data silos, it is common to utilize a separate data warehousing system.

As used herein, the term "data warehouse" or "data warehousing system" refers a repository of data from one or more data sources that is used primarily for reporting and data analysis operations. Data warehouses are typically designed to perform OLAP operations characterized by the use of potentially complex queries and the relatively low volume of transactions (when compared to the number of transactions performed by the organization's OLTP operations). To utilize a data warehouse, organizations traditionally extract data from their various data stores, transform the format and structure of the data as needed to fit the target data warehouse, and load that transformed data into the data warehouse. This process is referred to as Extract-Transform-Load ("ETL"). Utilizing a data warehouse allows an organization to create a data view across data stores for a specific point-in-time. For example, performing this ETL process allows an organization to create a point-in-time representation of its data so that it can perform data analysis across data stores. Such an approach presents various technical shortcomings. For example, the ETL process is both time-intensive and computationally expensive. Additionally, since the ETL process results in a point-in-time view of the organization's data, this ETL process must be performed each time the organization wishes to obtain a different view of its data (e.g., to perform additional analytical operations), resulting in significant expense.

To facilitate these backup and ETL operations, an organization is typically required to run, on its production servers (e.g., servers used to host its business application(s)), software to perform the necessary processing (e.g., generating the backup copies, performing the transformations, etc.). Using the production servers for this purpose, however, negatively impacts the performance of the organization by wasting computational resources that could otherwise be used to provide the organization's business application services. Additionally, by doing both backup and ETL operations, two independent workflows are being performed for the organization's data stores on a recurrent basis (e.g., every day), hitting the production servers multiple times a day and further exacerbating the negative performance impact.

In various embodiments, the disclosed systems and methods solve these and other technical problems by enhancing an organization's backup data (e.g., from multiple different data stores) with useful metadata and storing the backup data, along with the metadata, in a time-series data lake. As used in the art, a "data lake" generally refers to a data repository that is capable of storing structured data, semi-structured data, unstructured data, or binary data. Accordingly, a data lake might store database records (structured data), XML, or JSON data (semi-structured data), emails or PDFs (unstructured data), images or video (binary data), etc. The present inventors have recognized that enriching the data stored in a data lake with timestamp metadata provides numerous technical improvements over prior data lake implementations. These data lakes may be referred to as "time-series data lakes." As used herein, the term "time-series data lake" refers to a data repository that stores a time-series representation of data (that is, data that has been "enriched" to include one or more items of timestamp metadata). Throughout the remainder of this disclosure, references to a "data lake" (such as data lake 120 of FIG. 1 below) are understood to refer to a time-series data lake, unless otherwise noted. Should the Applicant intend to refer to prior data lake implementations, the term "prior data lake" will be used.

As a non-limiting example, the metadata may include a timestamp of when the backup data was extracted from the organization's data store, an identifier associated with the data store, a schema associated with the data store, access control information indicating those users authorized to access the source data, tags associated with the objects, file system-level permissions, record-level security (if applicable), the nature or classification of each column, object-level timestamps, file- or record-level checksums or hashed fingerprints, etc.

The disclosed data lake service may store the organization's backup data in a time-series data lake, for example using a column-oriented format for storing data (such as Apache™ Parquet, Apache™ Avro, Apache™ ORC, or a Clumio™-specific column-oriented format, as non-limiting examples), which may facilitate efficient retrieval of the organization's data. For example, in various embodiments, storing an organization's backup data, with this embedded metadata, in a time-series data lake may greatly improve the ability of the organization to retrieve a specific data view (e.g., across multiple data sources over a desired time period or at a desired point-in-time) without requiring the organization to perform additional, resource-intensive ETL operations. The term "view" (or "data view"), as used herein, refers to a selection of a particular set of data, from one or more of an organization's data sources, based on one or more criteria. For example, as described in greater detail below, the disclosed techniques allow a user associated with (or with the permission of) an organization to retrieve a desired view of the organization's backup data from the time-series data lake, for example based on one or more search criteria (or queries) provided by the user. Non-limiting examples of criteria that may be used to retrieve a data view from a time-series data lake include one or more of a timestamp, an identifier associated with the data store, a schema associated with the data store, access control information indicating those users authorized to access the source data, tags associated with the objects, file system-level permissions, record-level security (if applicable), the nature or classification of each column, object-level timestamps, file- or record-level checksums or hashed fingerprints, etc. Since the disclosed techniques utilize a time-series data lake in which the organization's backup data, ingested into the data lake from multiple different data sources, is enriched with metadata and stored in the data lake, the "view" provided to the user may include data from multiple different (and, potentially, siloed) data sources and from multiple different points in time. As a non-limiting example, a data view of an organization's backup data provided using the disclosed techniques may include one or more items of data from a first data source from a backup performed at a first point in time, one or more items of data from a second data source from a backup performed at the first point in time, one or more items of data from the first data source from a backup performed at a second point in time, one or more items of data from a third data source from a backup performed at a third point in time, etc. Accordingly, in various embodiments, the disclosed techniques enable an organization to obtain a desired view of its backup data across its various different data sources and from multiple different points in time.

The disclosed systems and methods may provide technical benefits in various contexts. For example, in the context of data warehousing, various disclosed methods reduce the burden on an organization's production data sources and hosts by eliminating the need for the disparate systems and processes to perform the compute- and I/O-intensive ETL operations, instead retrieving the organization's data as part of its data backup operations. Additionally, unlike traditional ETL operations, the disclosed systems and methods allow an organization the flexibility to generate data views across both data stores and time dimensions without the need to re-perform the ETL operations. Further, as described in more detail below, the disclosed systems and methods may improve an organization's ability to perform data retention (e.g., to comply with a legal hold request) and to modify (e.g., delete, mask, anonymize, etc.) selected subsets of an organization's backup data (e.g., to comply with a "Right to Be Forgotten" request) in a fast, computationally efficient manner.

In FIG. 1, block diagram 100 depicts a data protection service 102, which includes a data lake service 110 and a time-series data lake 120. In various embodiments, the data protection service 102 is configured to store backup data for various organizations. For example, in the embodiment of FIG. 1, a first organization (Org1) has two physical sites 130 and 132. In FIG. 1, Org1 site 130 includes various hosts 140A-140N (e.g., server systems) and various data stores 144A-144N. Note that, in various embodiments, the data stores 144 may be implemented using any of various, and potentially different, data storage technologies, each of which may utilize its own data storage format. As a non-limiting example, data store 144A may be an Oracle™ database and data store 144B (not separately shown) may be an IBM™ db2 database.

In FIG. 1, the various data stores 144 are stored on data storage device 142. Note that, although a single data storage device 142 is shown in FIG. 1 for clarity, an organization may use any suitable number of data storage devices 142.

Data stores 144 may be stored using any suitable type of data storage devices 142. The storage devices 142 may include any type of non-transitory computer data storage that is readable/writable. For example, the storage devices 142 may include one or more disk drives. The disk drives may be magnetically based drives (e.g. "hard drives"), optically based drives such as compact disk or digital video disk drives, solid state drives formed from various forms of integrated circuit based non-volatile memory (e.g. flash memory), etc. The storage devices 142 may include other forms of memory, including volatile memory such as random-access memory (static random-access memory or "SRAM", dynamic random-access memory or "DRAM", etc.). Any type or combination of storage devices may be used in various embodiments. Additionally (or in the alternative), Org1 may have a cloud account within a public or private cloud, which may use cloud computing resources to execute various applications and store data for Org1, rather than using on-site resources.

FIG. 1 further depicts a site 134 for a second organization (Org2). Sites 132 and 134 have been simplified in FIG. 1, for clarity. Note that, in various embodiments, an organization's site (e.g., Org1 site 132, Org2 site 134, etc.) may include any suitable number of data stores 144. Further, note that, in various embodiments, an organization may include one or more data stores that do not utilize the various services provided by the data protection service 102. In such embodiments, the data from such unprotected data stores may not be backed up (e.g., by the data protection service 102) and may not be available in the data lake 120 for subsequent access by a requesting entity 160.

Data protection service 102 may provide cloud-based data backup services for various organizations. For example, as shown in FIG. 1, the data protection service 102 may employ one or more local agents 150 in an organization's systems (e.g., in Org1 site 130 or 132 or Org1's cloud-based resources). As described in greater detail in the '007 Application, the local agent 150 may interact with the data protection service 102 to implement the data protections supplied by the data protection service 102. More specifically, the local agent 150, in various embodiments, is operable to determine which blocks of data (in one or more data stores 144) have changed since the most recent backup, compress and encrypt the blocks, assemble the blocks in a format used by the data protection service 102, and send the data (either directly or via a cloud-based data storage system) to the data protection service 102. Thus, rather than requiring the organization to hit each data store 144 individually as part of a separate ETL operation, the disclosed systems and methods use the data protection service 102 to perform the extraction operations on the organization's data stores 144 as part of the existing backup operations. That is, the data protection service 102 is already extracting data from an organization's data stores 144 as part of delivering backup and recovery services, in various embodiments, the disclosed techniques eliminate the need to burden the organization's data stores 114 twice—once for performing backup operations and again for performing ETL operations. Accordingly, in the depicted embodiment, the data protection service 102 may receive backup data, sent by the local agent 150, from various data stores 144 of Org1.

Note that, from the perspective of the data protection service 102, a data store may be viewed as a "data source." This convention of referring to a data store (e.g., data store 144A) as a "data source" when described from the perspective of the data protection service 102 is used throughout the remainder of this disclosure. Further note that, in various embodiments, each of the data stores 144 for an organization may be backed up (e.g., backup data may be sent to data protection service 102) either at the same or different times. For example, in some embodiments, backup data for all of the data stores 144 may be sent at the same time (e.g., during a non-peak time period for the organization) to the data protection service 102. In other embodiments, however, data from different data stores 144 may be backed up at different points in time (e.g., according to a schedule, upon satisfaction of one or more criteria, etc.). Thus, when backup data is received at the data protection service 102, the backup data is associated with both a time (e.g., the time at which the backup data was sent to, or received at, the data protection service 102) and a source (e.g., the data store 144 from which the backup data originated).

In some embodiments, the backup data may be provided in the form of a "physical backup" (also referred to herein as a "backup image" or a "snapshot") which may include a copy of the physical files of a data store (e.g., data files, log files, control files, etc.). Physical backups are often used, for example, in disaster recovery scenarios to recover a data store. A physical backup of a particular data store is typically provided in a format that is specific to the particular data store. For example, in instances in which a data store 144 is an Oracle™ database, a physical backup of that data store 144 is an Oracle™ RMAN backup. As another non-limiting example, in instances in which a data store 144 is an Amazon™ AWS™ RDS instance, the physical backup is an RDS snapshot of the RDS instance. In prior approaches, a backup system may simply store these backup images of the data stores 144. To subsequently access the data in these backup images, the backup images must be restored in the format in which they were originally saved. As a non-limiting example, to access data from a backup image of an Oracle™ database, one would need to restore that image using the Oracle™ RDBMS software. Such an approach presents various technical shortcomings. For example, this approach severely limits the ability of this backup data to be accessed in an on-demand manner. In such a system, for example, it would not be feasible or desirable to create custom data views of data from multiple data sources or from multiple points in time because, to do so, the system would have to restore all of the backup images onto dedicated sandbox environments that are equipped with the original data store software, and scan the regenerated data sources end-to-end to identify relevant records for OLAP processing, wasting a significant amount of time and computational resources.

In various embodiments, however, the disclosed data protection service 102 may extract the backup data from these backup images and enhance the extracted data with metadata (e.g., a timestamp associated with the extraction job, data source of the data, database schema of the data source, authentication and authorization information, access control lists, tags associated with the objects, file system-level permissions, record-level security (if applicable), the nature or classification of each column, object-level timestamps, file- or record-level checksums or hashed fingerprints, etc.). For example, in the depicted embodiment, data lake service 110 includes conversion module 112 and metadata enrichment module 114. Conversion module 112, in various embodiments, is operable to convert a physical backup of a data store 144 from a format associated with that data store 144 (e.g., from an RDS snapshot format, Oracle™ RMAN backup format, etc.) into a "logical backup" of that data store 144. For example, in some embodiments, creating a logical backup from a physical backup includes using vendor-specific APIs to extract data from its original, proprietary format to general purpose, readable files and records that may be ingested into the data lake 120 with one or more items of metadata.

As will be appreciated by one of skill in the art with the benefit of this disclosure, the term "logical backup" refers to an extracted copy of the logical data elements (e.g., tables, records, metadata, etc.) from a data source. As used herein, the term "data element" refers to a logical data representation that is no longer tied to the (potentially proprietary) format of the original data source from which the data element was extracted. Whereas the physical backup of a data source ties the data to a format that is proprietary to the data source's management software (e.g., Oracle™ RDBMS), the logical backup acts as the extraction mechanism where data is decoupled from backend software infrastructure of the source and is infused with metadata, by the metadata enrichment module 114, before it is stored in data lake 120. For example, in embodiments in which a particular data store 144 is an Oracle™ database, the physical backup of this data store 144 may be an Oracle™ RMAN backup, from which the conversion module 112 may extract various different types of data elements, including records, tables, indexes, etc. that are no longer tied to the proprietary Oracle™ database format. Thus, in various embodiments, the logical backup being generated has no dependency on the original data source software and is passed through a columnar compression engine after metadata enrichment. As will be appreciated by one of skill in the art with the benefit of this disclosure, storing the data elements in a column-oriented format may provide various technical benefits, such as optimizing the storage format for faster queries, providing granular retrieval, and enabling larger scale. Continuing with the example above, for instance, in which a data store 144 is an Oracle™ database, the conversion module 112 may convert the physical backup (the Oracle™ RMAN backup) into a logical backup that extracts all of the data records that were in the Oracle™ database at the time the Oracle™ RMAN backup was created. These records are metadata enriched to include metadata such as source identifier, time marker, authentication and authorization and so on before it lands on columnar compression layer of the data lake 120.

By converting backup data from a backup image to a logical backup, the data lake service 110 is able to enrich the backup data with valuable metadata and store that enriched backup data in a time-series data lake 120 in a format that allows for efficient retrieval (e.g., Apache™ Parquet format), as described in more detail below. For example, metadata enrichment module 114, in various embodiments, is operable to generate metadata associated with the backup and embed the metadata into the logical backup data. Non-limiting examples of items of metadata that may be generated by metadata enrichment module 114 include: a timestamp of when the backup data was extracted from the organization's data store 144 or received at the data protection service 102, an identifier associated with the data store 144 from which the backup data originated, a schema associated with the data store 144, access control information indicating those users and systems authorized to access the source data, tags associated with the objects, file system-level permissions, record-level security (if applicable), the nature or classification of each column, object-level timestamps, file- or record-level checksums or hashed fingerprints, etc.

Note that, in some embodiments, one or more items of metadata may be included with the backup data sent by the local agent 150. For example, in some embodiments, when local agent 150 sends a backup image of a given data store 144 to the data protection service 102, the local agent 150 may include various items of metadata, such as when the backup image was created, a schema associated with the data store 144, access control information associated with the data store 144 (or the data records or tables contained therein), etc. In some such embodiments, the local agent 150 may retrieve one or more items of metadata from the data store 144 as it prepares the backup data to be sent to the data protection service 102. Accordingly, in some embodiments, metadata enrichment module 114 is operable to "generate" metadata corresponding to a backup operation by identifying the one or more items of metadata sent along with the backup image of a data source 144. Additionally, in some embodiments, metadata enrichment module 114 is operable to generate items of metadata locally. For example, in some embodiments, metadata enrichment module 114 is operable to generate a timestamp associated with backup data in response to receiving the backup data from the local agent 150. As a non-limiting example, in embodiments that utilize the Java™ programming language, metadata enrichment module 114 may use methods from the java.util.Date or java.util.Calendar classes to generate a timestamp that corresponds to the time at which backup data for a particular data store 144 was received by the data protection service 102. Further note that, in some instances, a given item of metadata may correspond to backup data for an entire data store 144 (e.g., such as a timestamp corresponding to the time at which a backup image was generated). In other instances, however, a given item of metadata may correspond to a subset of backup data for a data store 144. For example, in many instances, a data store 144 may be a database that includes numerous data records, each which may have a field with corresponding access control information indicating those users who are (or are not) permitted to access the data in that record. In some embodiments, such access control information may be considered metadata that is specific to the individual data records within a data store 144.

Data lake service 110, in various embodiments, is operable to store the logical backup data for an organization (Org1, in the current example), along with the generated metadata, in a data lake 120 associated with the organization. Stated differently, in various embodiments, the data lake service 110 is operable to transform an organization's backup data into a logical, addressable format that is enriched with various items of metadata, such as timeline information, access control information, and source information. Thus, in various embodiments, a data lake 120 provides a time-series representation of various data sources 144 in an organization's system. As described in more detail below, in various embodiments, the metadata enrichment process is performed during ingestion of data onto a data lake 120 to create the time-series representation of one or more of an organization's data sources. Note that, in some embodiments, data may be stored in a data lake 120 as a self-describing object, rather than as a data record. For example, as noted above, in some embodiments, the data lake service 110 stores this backup data in the data lake 120 using the Apache™ Parquet format.

In FIG. 1, data protection service 102 includes a data lake storage system 118, which stores various data lakes 120A-120N. In various embodiments, data lake storage system 118 may be implemented using the simple storage service ("S3") in the AWS™ public cloud. Note, however, that this embodiment is provided merely as one non-limiting example and, in other embodiments, any suitable data storage system may be used. In some embodiments, each organization may have its own data lake 120 used to store the time-series data for the organization. In the depicted embodiment, for example, data protection service 102 maintains a data lake 120A that stores "enriched" time-series data (that is, logical data with embedded metadata, such as timing information) for Org1. In some embodiments, data lake service 110 may maintain multiple data lakes 120 for an organization. Note that, in various embodiments, data lake service 110 may store time-series data for an organization (e.g., Org1) from multiple different physical sites (e.g., sites 130 and 132) and cloud-based sites in a single data lake 120 (e.g., data lake 120A). In various embodiments, this technique enables the data protection service 102 to provide visibility to the user(s) in an organization of across all data stores of the organization, regardless of the particular location at which data happens to be stored.

Note that, as used herein, the term "time-series data lake" differs from a "time-series database." A time-series database is a software system that is optimized for storing and serving time-series data through associated pairs of times and values. For example, early time-series databases were associated with industrial applications that could store measured values from sensory equipment and are now used in support of a wider range of applications in production systems. The disclosed time-series data lake 120, unlike a time-series database, is not a database and, as such, is not designed to record time-series data in a structured manner from sensors or other front-end applications. Instead, in various embodiments, the disclosed time-series data lake sources data from pre-existing data sources (which, in some embodiments, may include one or more time-series databases) and liberates that data from the proprietary format of the original data sources and enriches that data with one or more items of metadata.

Data lake service 110 further includes data retrieval module 116, which, in various embodiments, is operable to retrieve a selected view of an organization's time-series data, across one or more sources, from the data lake 120. For example, in the depicted embodiment, a requesting entity 160 sends a request 162 for a particular view of an organization's data. In some embodiments, the requesting entity 160 may be a data warehousing system (or a user associated with a data warehousing system) requesting, for example, a particular view of Org1's time-series data from the data lake 120A. Some such embodiments are described in more detail below with reference to FIG. 6. In other embodiments, the requesting entity 160 may be a user (e.g., a data scientist) associated with an organization that is directly connecting to a data lake 120. For example, in some embodiments, data retrieval module 116 operates as a driver (an Open Database Connectivity ("ODBC") protocol driver) that allows a requesting entity (e.g., a data scientist using a business intelligence tool, such as Tableau™) to directly access and query a data lake 120. As a non-limiting example of one such embodiment, the requesting entity 160 may be a data scientist associated with Org1 that is directly connecting to Org1's data lake 120A to perform an ODBC query (e.g., as an ad hoc query rather than a complete data warehousing operation) against Org1's time-series data maintained in the data lake 120A.

In various embodiments, the request 162 may include one or more criteria that the data retrieval module 116 may use to query the data lake 120A for the requested data view 164. As non-limiting examples, the parameters in the request 162 may include a point-in-time for which to retrieve data, a time period for which to retrieve data, an identifier of the organization for which to retrieve data, an identifier of the data lake 120 from which to retrieve data, authentication or authorization information (e.g., a token, credentials, etc.) associated with the organization or data lake 120, one or more data sources 144 from which to retrieve data, one or more search terms or identifiers (e.g., alphanumeric keywords) to include in the query, American National Standards Institute ("ANSI") SQL-based queries, or any other suitable criteria that the data retrieval module 116 may use to retrieve the desired data view 164 from the data lake 120A. In various embodiments, the data retrieval module 116 is operable to construct a query based on these criteria and execute the query against the data lake 120A. Thus, in various embodiments, the data retrieval module 116 is operable to search across multiple, disparate data sources (e.g., all of, or any combination of, data stores 144A-144N) and times, using the embedded metadata in the data lake 120A to retrieve the desired data view in a fast and computationally efficient manner. In some embodiments, the data retrieval module 116 operates as a retrieval service that parses data and metadata in the data lake 120 (e.g., based on one or more criteria) to retrieve desired data views 164 from an organization's backup data stored in the data lake 120. These desired data views may then be provided to a requesting entity 160 (e.g., a data warehousing system), as desired. Further, in some embodiments, the data retrieval module 116 is operable to serve as a driver (e.g., an ODBC driver) that allows a requesting entity (such as business intelligence tools, external tables interface in a data warehouse, etc.) to directly query a data lake 120.

In various embodiments, the disclosed systems and methods allow an organization to generate, at least, the following data views of the organization's data in an on-demand manner in the cloud, without requiring the organization to perform additional ETL operations using its production resources:

1. A view of all data stored in the data lake 120 for the entire time-series as a single data view;
2. A view of all data stored in the data lake 120 for a selected time window in the time-series;
3. A view of all data stored in the data lake 120 for a selected point-in-time;
4. A view of data from a specific data source (e.g., data store 152A) in the data lake 120 for the entire time series;
5. A view of data from a specific data source in the data lake 120 for a selected time window in the time-series;
6. A view of data from a specific data source in the data lake 120 for a selected point-in-time;
7. A view of a subset of the data from a specific data source in the data lake 120 for the entire time-series;
8. A view of a subset of the data from a specific data source in the data lake 120 for a selected time window in the time-series;
9. A view of a subset of the data from a specific data source in the data lake 120 for a selected point-in-time;
10. A view of a union of subsets of data stored in the data lake 120, from any number of data sources, for the entire time-series;
11. A view of a union of subsets of data stored in the data lake 120, from any number of data sources, for a selected time window in the time-series; or
12. A view of a union of subsets of data stored in the data lake 120, from any number of data sources, for a selected point-in-time The disclosed systems and methods may allow retrieval of any of these various data views in an on-demand manner for various purposes. For example, as noted above, an organization may utilize a data warehouse to perform analytical operations on selected view of data from the data lake 120. Some such embodiments are described in more detail below with reference to FIG. 6. Additionally, note that although data lake service 110 has been described as retrieving data views for a data warehousing system, the present disclosure is not limiting to such embodiments. For example, in some embodiments, the disclosed systems and methods may be used to perform data preservation operations to preserve subsets of data included in a data lake 120 (described below with reference to FIGS. 6-7) and to modify (e.g., delete, mask, anonymize, etc.) data stored in an organization's data lake 120 in an efficient manner (described below with reference to FIGS. 8-9).

Figure 2:
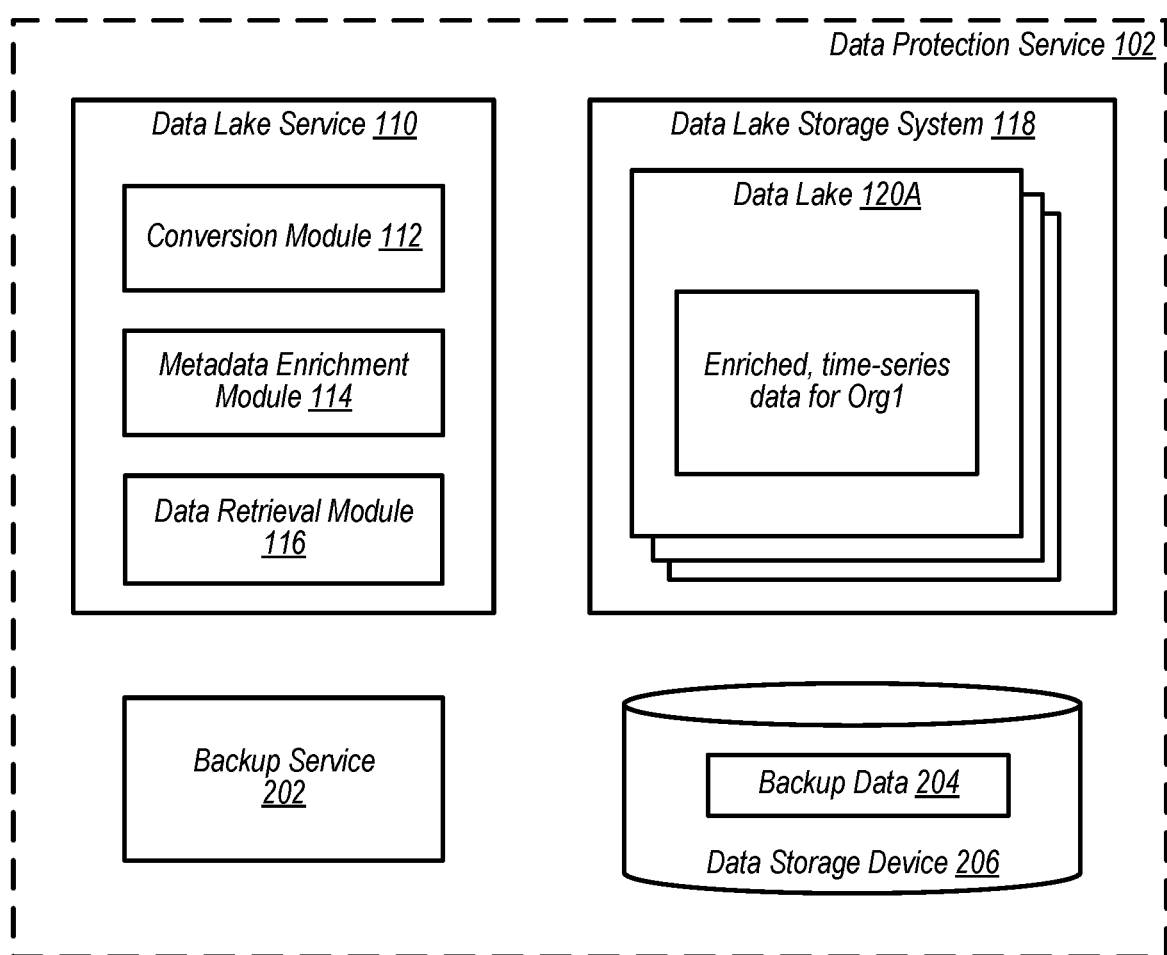
FIG. 2 is a block diagram illustrating an example data protection service, according to some embodiments.

Turning now to FIG. 2, block diagram 200 depicts data protection service 102 in more detail, according to some embodiments. More specifically, in the embodiment of FIG. 2, data protection service 102 includes backup service 202, which, in various embodiments, is operable to perform one or more of the various data protection services described in the '007 Application. For example, in some embodiments, backup service 202 is (or is included as part of) the Clumio™ backup and data protection service that provides secure backup-as-a-service. In the depicted embodiment, for example, backup service 202 is operable to store backup data 204 for one or more organizations in one or more data storage devices 206. For Org1 of FIG. 1, for instance, backup service 202 is operable to receive backup data (e.g., as backup images) corresponding to Org1's various data stores 144. For example, as described in more detail in the '007 Application, one or more of Org1's hosts 140 may include a local agent 150 that is operable to periodically provide backup data from the various data stores 144 to the data protection service 102, which may then store the backup data 204 on one or more data storage devices 206. Note that, although shown as part of data protection service 102 in FIG. 1, backup service 202 may store backup data 204 on one or more local or remote data storage devices 206, according to various embodiments. As a non-limiting example, data storage device 206 may be implemented as block storage supported by one or more public cloud services (e.g., elastic block store ("EBS") in the AWS™ public cloud, as one non-limiting example). The block storage may support a block-based storage and access mechanism, similar to the access model for disk drives and the like. In other embodiments, data storage device 208 may be implemented using an object-based storage supported by one or more public cloud services (e.g., S3 in the AWS™ public cloud). Further note that, in various embodiments, data protection service 102 is implemented as a cloud-based service, utilizing public or private cloud-based resources, such as server computer systems, data stores, data storage devices, networking elements, etc., to perform the various operations described herein. As one non-limiting example, in some embodiments, the data protection service 102 may be implemented using various services provided by the AWS™ cloud-computing platform.

Figure 3A:
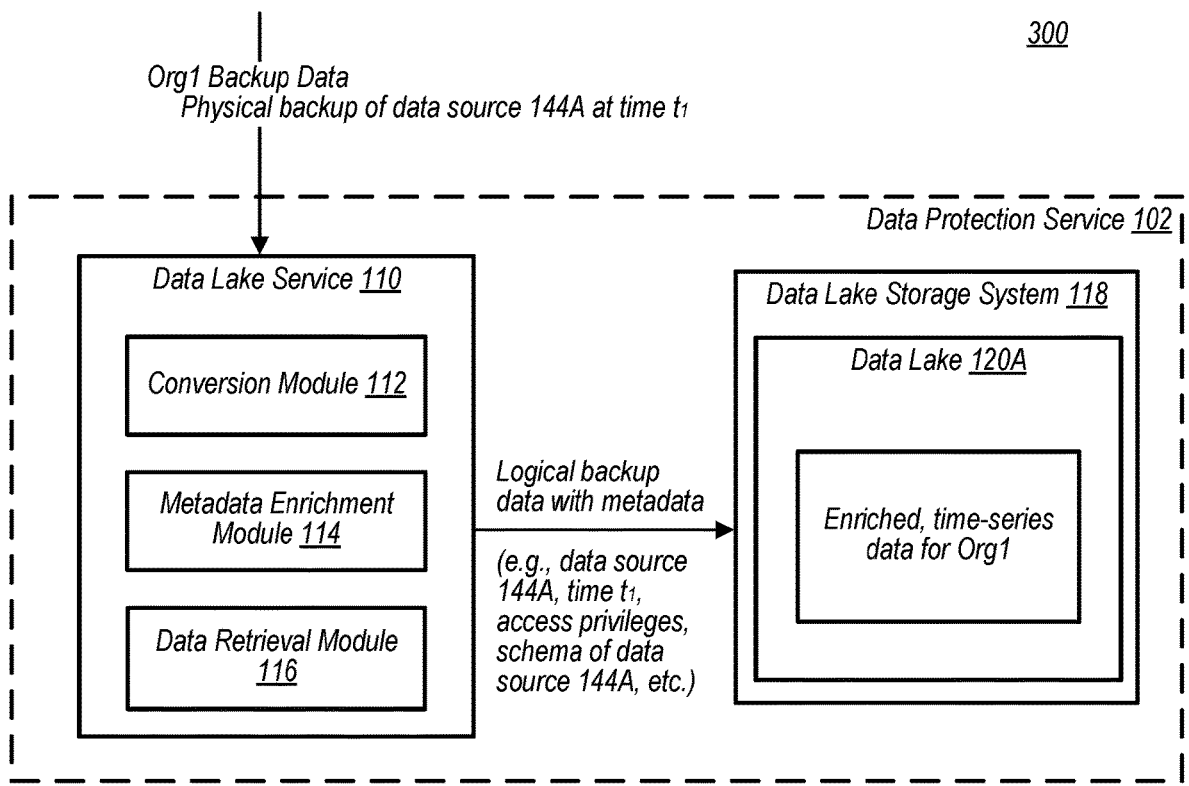
FIG. 3A is a block diagram illustrating an example embodiment in which a data protection service receives backup data in the form of a physical backup, according to some embodiments.
Figure 3B:
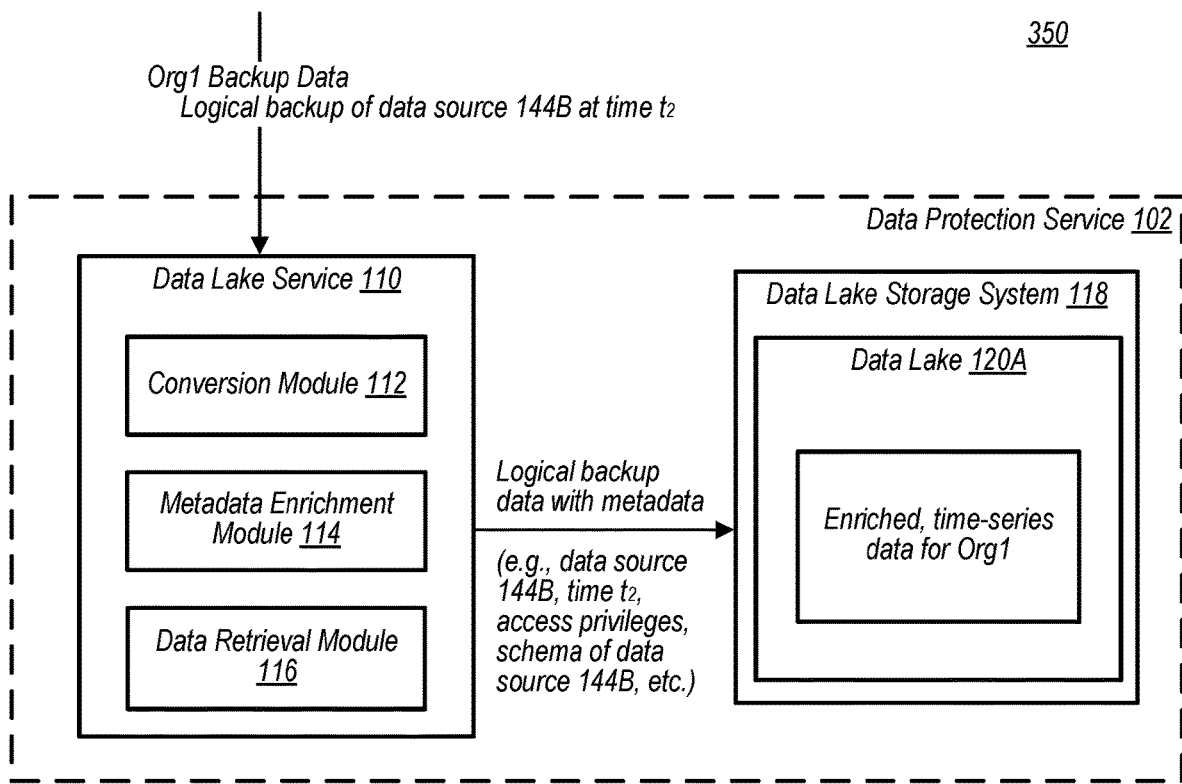
FIG. 3B is a block diagram illustrating an example embodiment in which a data protection service receives backup data in the form of a logical backup, according to some embodiments.

In various embodiments, backup data for an organization may be provided to the data protection service 102 in various formats. For example, FIG. 3A depicts an example embodiment in which the backup data for Org1 is provided in the form of physical backups of one or more of Org1's data stores 144. In such embodiments, data lake service 110 is operable to convert the physical backups into logical backups, extracting the logical data elements (e.g., tables, records, etc.) and enhancing the extracted data with various items of metadata and storing the enriched backup data in the data lake 120A, as described above. In some embodiments, however, note that the backup data may be provided to the data protection service 102 already in a logical backup format. For example, FIG. 3B depicts an example embodiment in which the backup data for Org1 is provided in the form of logical backups of one or more of Org1's data stores 144. In such embodiments, data lake service 110 is operable to generate metadata associated with this backup data and store the enriched backup data in the data lake 120A, as described above.

Referring now to FIG. 4A-4B, flow diagrams illustrating example methods 400 and 450 for storing backup data, along with one or more items of metadata, in a time-series data lake are respectively depicted, according to two non-limiting embodiments. In various embodiments, method 400 or 450 may be performed by data protection service 102 of FIG. 1 to store backup data for Org1, from one or more data stores 144, in data lake 120A. As noted above, in various embodiments, data protection service 102 may be implemented as a cloud-based service using public or private cloud-based computing resources, such as server computer systems. In some such embodiments, the server computer system(s) used to implement the data protection service 102 may include (or have access to) a non-transitory, computer-readable medium having program instructions stored thereon that are executable by the server computer system(s) to cause the operations described with reference to FIG. 4A or 4b. In FIG. 4A, method 400 includes elements 402-408. In FIG. 4B, method 450 includes elements 452-458. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the data protection service 102 receives backup data for an organization as part of one or more backup operations. In some embodiments, the backup data includes a first backup image, of a first data source, that was generated at a first point in time. For example, as shown in FIG. 3A, data protection service 102 may receive (e.g., from a local agent 150 executing on one or more hosts 140 at Org1 site 130) a physical backup of a data source 144A that was created at a first point in time $t_1$. At 404, in the illustrated embodiment, the data protection service 102 creates a logical backup of the first data source using the first backup image. For example, in some embodiments, the conversion module 112 is operable to convert a physical backup (e.g., a backup image) of a data source into a logical backup of that data source. In some embodiments, the logical backup includes a plurality of data records from the first data source at the first point in time. For example, in some embodiments, creating the logical backup of the first data source may include extracting the plurality of data records from the first backup image such that logical backup data in the logical backup is independent of a physical backup format associated with the first data source.

At 406, in the illustrated embodiment, the data protection service 102 generates metadata associated with the data source. For example, metadata enrichment module 114 may generate metadata associated with backup data from a data source 144A that is received from the Org1. As non-limiting examples, the metadata may include timestamp information corresponding to the first point in time $t_1$ at which the physical backup was made, an identifier associated with the first data source, access control information identifying users with access to one or more of the plurality of data records, a schema associated with the first data source, etc. At 408, in the illustrated embodiment, the data protection service 102 stores the logical backup and the metadata in a time-series data lake 120A associated with the organization. Note that, in some embodiments, method 400 may include the data protection service 102 embedding the metadata into the logical backup. For example, in various embodiments, the metadata enrichment module 114 is operable to embed an organization's backup data with metadata (e.g., source and timestamp information) before storing the enriched backup data in the data lake 120. In various embodiments, 408 may include storing the logical backup data, with the embedded metadata, in the time-series data lake 120A in a column-oriented format (e.g., Apache™ Parquet).

Turning now to FIG. 4B, method 450 begins at 452 where, in the illustrated embodiment, the data protection service 102 provides a data lake service 110 that maintains data for a plurality of organizations. For example, for a first organization (Org1), the data lake service 110 may maintain a time-series data lake that stores a time-series representation of data associated with the first organization.

At 454, in the illustrate embodiment, the data protection service 102 receives backup data from a plurality of data sources associated with the first organization. The backup data, in some embodiments, may include a first physical backup, of a first one of the plurality of data sources, which was created at a first point in time and provided in a first format. As non-limiting examples, the first physical backup may be an Amazon™ RDS snapshot, a snapshot of an Amazon™ DynamoDB database, a snapshot of an Amazon™ Neptune database, a snapshot of an Amazon™ Aurora database, a snapshot of a Microsoft™ Azure SQL database, etc., according to various embodiments. Further, in some embodiments, the backup data may include a second physical backup, of a second one of the plurality of data sources, which was created at a second point in time and provided in a second, different format. Note that, in various embodiments, the backup data may include structured data (e.g., databases), semi-structured data (e.g., XML, or JSON data), or unstructured data (e.g., emails, PDFs, etc.), or binary data (e.g., images, video, audio, etc.).

In some embodiments, method 450 may include the data protection service 102 converting the backup data from one or more physical backup formats into logical backup data. For example, in some embodiments, converting the backup data from one or more physical backup formats into logical backup data includes converting the first physical backup into a first logical backup of the first data source, where the first logical backup includes a first plurality of data records from the first data source at the first point in time. Further, in some embodiments, converting the backup data may include converting the second physical backup into a second logical backup of the second data source, where the second logical backup includes a second plurality of data records from the second data source at the second point in time.

At 456, in the illustrated embodiment, the data protection service 102 generates metadata associated with the backup data received at element 454. For example, for a given data element of the backup data, the corresponding may include source information identifying a particular one of the plurality of data sources from which the given data element of the backup data originated. At 458, in the illustrated embodiment, the data protection service 102 stores the backup data and the metadata in the time-series data lake 120A. For example, 458 may include embedding the metadata into the logical backup data and then storing the logical backup data, with the embedded metadata, in the time-series data lake 120A using a particular file format (e.g., Apache™ Parquet format).

Referring now to FIG. 5, a flow diagram illustrating an example method 500 for retrieving data from a time-series data lake is depicted, according to some embodiments. In various embodiments, method 500 may be performed by data protection service 102 of FIG. 1 to retrieve a particular view of backup data for a particular organization (e.g., Org1) from a data lake 120 (e.g., data lake 120A) maintained by the data protection service 102. As noted above, in various embodiments, data protection service 102 may be implemented as a cloud-based service using public or private cloud-based computing resources, such as server computer systems. In some such embodiments, the server computer system(s) used to implement the data protection service 102 may include (or have access to) a non-transitory, computer-readable medium having program instructions stored thereon that are executable by the server computer system(s) to cause the operations described with reference to FIG. 5. In FIG. 5, method 500 includes elements 502-508. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the data protection service 102 provides a data lake service 110 that maintains data for a plurality of organizations where, for a first organization (e.g., Org1), the data lake service 110 maintains a time-series data lake 120A that stores a time-series representation of backup data associated with the first organization. In some embodiments, the backup data may include first backup data from a first data source created at a first point in time and second backup data from a second data source created at a second, different point in time. In some embodiments, the time-series representation of the backup data includes metadata associated with the backup data. For example, for a given data element of the backup data in the time-series data lake 120A, the metadata may indicate a data source from which the given data element of the backup data originated and a time at which the given data element of the backup data was backed up.

At 504, in the illustrated embodiment, the data protection service 102 receives, from a requesting entity, a request for data associated with the first organization. In some embodiments, for example such as those described in more detail below with reference to FIGS. 6-7, the requesting entity may be (or be associated with) a data warehousing system. In other embodiments, for example such as those discussed in more detail below with reference to FIGS. 8-9, the request received at 504 may be sent from a data preservation service.

At 506, in the illustrated embodiment, based on one or more of the search criteria included in the request, the data protection service 102 retrieves a particular view of the backup data stored in the time-series data lake. In some embodiments, the retrieving the particular view of the backup data includes executing a query against the time-series data lake 120A, for example by parsing the metadata associated with the backup data based on the one or more search criteria. Note that, in some embodiments, the request received at 504 may include a query specified by the requesting entity (e.g., provided using the Open Database Connectivity ("ODBC") protocol). In other embodiments, method 500 may include creating a query based on the one or more of the search criteria included in the request.

At 508, in the illustrated embodiment, the data protection service 102 provides the particular view of the backup data to the requesting entity. In some embodiments, for example, the particular view of the backup data may include a subset of data that was extracted from a particular backup of a first data source. In some embodiments, method 500 further includes storing, by the data-protection service, the particular view of the backup data in a particular storage location that retains data according to a first data-retention policy that differs from a second data-retention policy of the time-series data lake 120A. In some such embodiments, subsequent to storing the particular view in the particular storage location, method 500 includes the data protection service 102 monitoring the time-series data lake 120A to determine whether updated backup data also matches the one or more search criteria specified in the request.

Example Embodiments: Storing Backup Data in a Time-Series Data Lake

1. A method, comprising:
   providing, by a cloud-based service, a data lake service that maintains data for a plurality of organizations, wherein, for a first one of the plurality of organizations, the data lake service maintains a time-series data lake that stores a time-series representation of data associated with the first organization;
   receiving, by the cloud-based service, backup data, associated with the first organization, from a plurality of data sources;
   generating, by the cloud-based service, metadata associated with the backup data, wherein, for a given data element of the backup data, corresponding metadata includes source information identifying a particular one of the plurality of data sources from which the given data element of the backup data originated; and
   storing, by the cloud-based service, the backup data and the metadata in the time-series data lake.

2. The method of claim 1, wherein the backup data includes:
   a first physical backup, created at a first point in time, of a first one of the plurality of data sources, wherein the first physical backup is provided in a first format; and
   a second physical backup, created at a second point in time, of a second one of the plurality of data sources, wherein the second physical backup is provided in a second format.

3. The method of claim 2, wherein the first physical backup is an Amazon™ RDS Snapshot.

4. The method of claim 2, further comprising:
   converting, by the cloud-based service, the backup data from one or more physical backup formats, associated with the plurality of data sources, into logical backup data.

5. The method of claim 4, wherein the storing the backup data and the metadata in the time-series data lake includes:
   embedding the metadata into the logical backup data; and
   storing the logical backup data, with the embedded metadata, in the time-series data lake in a particular format.

6. The method of claim 5, wherein the particular format is the Apache™ Parquet file format.

7. The method of claim 4, wherein the converting the backup data from the one or more physical backup formats into logical backup data includes:
converting the first physical backup into a first logical backup of the first data source, wherein the first logical backup includes a first plurality of data records from the first data source at the first point in time; and
converting the second physical backup into a second logical backup of the second data source, wherein the second logical backup includes a second plurality of data records from the second data source at the second point in time.

8. The method of claim 7, wherein, for a given one of the first plurality of data records, the metadata includes a timestamp indicative of the first point in time.

9. The method of claim 7, wherein, for a given one of the first plurality of data records, the metadata specifies the first data source and the first point in time; and
wherein, for a given one of the second plurality of data records, the metadata specifies the second data source and the second point in time.

10. The method of claim 1, wherein the backup data includes unstructured data.

11. A non-transitory, computer-readable medium having program instructions stored thereon that are executable by one or more computer systems to perform operations comprising:
providing a cloud-based data lake service that maintains data for a plurality of organizations, wherein, for a first one of the plurality of organizations, the cloud-based data lake service maintains a time-series data lake that stores a time-series representation of data associated with the first organization;
receiving backup data, associated with the first organization, from a plurality of data sources;
generating metadata associated with the backup data, wherein, for a given data element of the backup data, corresponding metadata includes source information identifying a particular one of the plurality of data sources from which the given data element of the backup data originated; and
storing the backup data and the metadata in the time-series data lake.

12. The non-transitory, computer-readable medium of claim 11, wherein the backup data includes:
a first physical backup, created at a first point in time, of a first one of the plurality of data sources, wherein the first physical backup is provided in a first format; and
a second physical backup, created at a second point in time, of a second one of the plurality of data sources, wherein the second physical backup is provided in a second format.

13. The non-transitory, computer-readable medium of claim 12, wherein the operations further comprise:
converting the backup data from one or more physical backup formats, associated with the plurality of data sources, into logical backup data.

14. The non-transitory, computer-readable medium of claim 13, wherein the storing the backup data and the metadata in the time-series data lake includes:
embedding the metadata into the logical backup data; and
storing the logical backup data, with the embedded metadata, in the time-series data lake in a particular format.

15. The non-transitory, computer-readable medium of claim 13, wherein the converting the backup data from the one or more physical backup formats into logical backup data includes:
converting the first physical backup into a first logical backup of the first data source, wherein the first logical backup includes a first plurality of data records from the first data source at the first point in time; and
converting the second physical backup into a second logical backup of the second data source, wherein the second logical backup includes a second plurality of data records from the second data source at the second point in time.

16. The non-transitory, computer-readable medium of claim 15, wherein, for a given one of the first plurality of data records, the metadata includes a timestamp indicative of the first point in time.

17. A method, comprising:
receiving, by a cloud-based service, backup data for an organization as part of one or more backup operations, wherein the backup data includes a first backup image, of a first data source, that was generated at a first point in time;
creating, by the cloud-based service, a logical backup of the first data source using the first backup image, wherein the logical backup includes a plurality of data records from the first data source at the first point in time;
generating, by the cloud-based service, metadata associated with the first backup image; and
storing, by the cloud-based service, the logical backup and the metadata in a time-series data lake associated with the organization.

18. The method of claim 17, wherein the creating the logical backup of the first data source includes extracting the plurality of data records from the first backup image such that logical backup data in the logical backup is independent of a physical backup format associated with the first data source; and
wherein the method further comprises embedding the metadata into the logical backup data.

19. The method of claim 18, wherein the storing the logical backup and the metadata in the time-series data lake includes:
storing the logical backup data, with the embedded metadata, in the time-series data lake in a column-oriented format.

20. The method of claim 17, wherein the metadata includes at least one of:
a time stamp corresponding to the first point in time;
an identifier associated with the first data source;
access control information identifying users with access to one or more of the plurality of data records; and
a schema associated with the first data source.

Example Embodiments: Retrieving Data from a Time-Series Data Lake

1. A method, comprising:
providing, by a cloud-based service, a data lake service that maintains data for a plurality of organizations, wherein, for a first one of the plurality of organizations, the data lake service maintains a time-series data lake that stores a time-series representation of backup data associated with the first organization;

receiving, by the cloud-based service from a requesting entity, a request for data associated with the first organization, wherein the request includes one or more search criteria;

based on the one or more search criteria, retrieving, by the cloud-based service, a particular view of the backup data stored in the time-series data lake; and providing, by the cloud-based service, the particular view of the backup data to the requesting entity.

2. The method of claim 1, wherein the retrieving the particular view of the backup data includes executing a query against the time-series data lake, wherein the query is based on the one or more search criteria.

3. The method of claim 1, wherein the backup data includes:

first backup data from a first data source, wherein the first backup data was created at a first point in time; and second backup data from a second data source, wherein the second backup data was created at a second point in time; and wherein the particular view of the backup data includes a subset of the first backup data and a subset of the second backup data.

4. The method of claim 1, wherein the time-series representation of the backup data includes metadata associated with the backup data, wherein, for a given data element of the backup data in the time-series data lake, the metadata indicates:

a data source from which the given data element of the backup data originated; and a time at which the given data element of the backup data was backed up; and wherein the retrieving the particular view includes parsing the metadata associated with the backup data based on the one or more search criteria.

5. The method of claim 1, wherein the requesting entity is a data warehousing system.

6. The method of claim 1, wherein the request for data associated with the first organization is received from a data preservation service.

7. The method of claim 1, wherein the particular view of the backup data includes first data that was extracted from a particular backup of a first data source, and wherein the particular view does not include all of the data from the particular backup of the first data source.

8. The method of claim 7, further comprising:

storing, by the cloud-based service, the particular view of the backup data in a particular storage location that retains data according to a first retention policy that differs from a second retention policy of the time-series data lake.

9. The method of claim 8, further comprising:

subsequent to the storing the particular view in the particular storage location, monitoring, by the cloud-based service, the time-series data lake to determine whether updated backup data matches the one or more search criteria.

10. A non-transitory, computer-readable medium having instructions stored thereon that are executable by a computer system to perform operations comprising:

providing a cloud-based data lake service that maintains data for a plurality of organizations, wherein, for a first one of the plurality of organizations, the cloud-based data lake service maintains a time-series data lake that stores a time-series representation of backup data associated with the first organization;

receiving, from a requesting entity, a request for data associated with the first organization, wherein the request includes one or more search criteria;

based on the one or more search criteria, retrieving a particular view of the backup data stored in the time-series data lake; and providing the particular view of the backup data to the requesting entity.

11. The non-transitory, computer-readable medium of claim 10, wherein the retrieving the particular view of the backup data includes executing a query against the time-series data lake, wherein the query is based on the one or more search criteria.

12. The non-transitory, computer-readable medium of claim 10, wherein the backup data includes:

first backup data from a first data source, wherein the first backup data was created at a first point in time; and second backup data from a second data source, wherein the second backup data was created at a second point in time; and wherein the particular view of the backup data includes a subset of the first backup data and a subset of the second backup data.

13. The non-transitory, computer-readable medium of claim 10, wherein the time-series representation of the backup data includes metadata associated with the backup data, wherein, for a given data element of the backup data in the time-series data lake, the metadata indicates:

a data source from which the given data element of the backup data originated; and a time at which the given data element of the backup data was backed up; and wherein the retrieving the particular view includes parsing the metadata associated with the backup data based on the one or more search criteria.

14. The non-transitory, computer-readable medium of claim 10, wherein the request includes a query specified by the requesting entity.

15. The non-transitory, computer-readable medium of claim 14, wherein the query is provided, by the requesting entity, using the Open Database Connectivity ("ODBC") protocol.

16. The non-transitory, computer-readable medium of claim 10, wherein the operations further comprise:

creating a query based on one or more search criteria included in the request; and wherein the retrieving the particular view of the backup data includes executing the query against the time-series data lake.

17. A system, comprising:

at least one processor;

a non-transitory, computer-readable medium having instructions stored thereon that are executable by the at least one processor to cause the system to:

provide a cloud-based data lake service that maintains data for a plurality of organizations, wherein, for a first one of the plurality of organizations, the cloud-based data lake service maintains a time-series data lake that stores a time-series representation of backup data associated with the first organization;

receive, from a requesting entity, a request for data associated with the first organization, wherein the request includes one or more search criteria;

based on the one or more search criteria, retrieve a particular view of the backup data stored in the time-series data lake; and provide the particular view of the backup data to the requesting entity.

18. The system of claim 17, wherein the backup data includes:

first backup data from a first data source, wherein the first backup data was created at a first point in time; and second backup data from a second data source, wherein the second backup data was created at a second point in time; and wherein the particular view of the backup data includes a subset of the first backup data and a subset of the second backup data.

19. The system of claim 17, wherein the time-series representation of the backup data includes metadata associated with the backup data, wherein, for a given data element of the backup data in the time-series data lake, the metadata indicates:

a data source from which the given data element of the backup data originated; and a time at which the given data element of the backup data was backed up; and wherein retrieving the particular view includes parsing the metadata associated with the backup data based on the one or more search criteria.

20. The system of claim 17, wherein the instructions are further executable to cause the system to:

store the particular view of the backup data in a particular storage location that retains data according to a first retention policy that differs from a second retention policy of the time-series data lake; and subsequent to the storing the particular view in the particular storage location, monitor the time-series data lake to determine whether updated backup data matches the one or more search criteria.

Providing Data Views from a Time-Series Data Lake to a Data Warehousing System

In various embodiments, the disclosed systems and methods may be used to retrieve, in an on-demand manner, select views of an organization's backup data stored in a data lake 120. These selected data views can then be provided to a data warehousing system for use in analytical operations for the organization, allowing the organization to perform analytical operations using data from any combination of an organization's data sources and across any desired time period or at any desired point in time.

Prior techniques for providing selected data views to a data warehouse for analytical operations present various technical problems. For example, as noted above, organizations are traditionally required to perform time-intensive and computationally expensive ETL operations to construct a desired view of their data each time the organization wishes to perform analytical operations using a data warehousing system. Using this prior approach, an organization extracts data from its various data stores, transforms the format and structure of the extracted data as needed to fit the target data warehousing system, and loads the extracted, transformed data the into data warehousing system. Since the ETL process results in a point-in-time view of the organization's data, this ETL process must be performed each time the organization wishes to obtain a different view of its data (e.g., to perform additional analytical operations), resulting in significant delay to perform the analytical operations and wasting the organization's production resources that could otherwise be used to provide the organization's business application services.

In various embodiments, however, the disclosed systems and methods solve these technical problems presented by prior approaches. For example, in various embodiments, the disclosed techniques eliminate the need for an organization to perform these complex ETL operations to feed data from their data stores into a data warehouse. As described above, for example, an organization may use the data protection service 102 to back up its various on-premises or cloud-based data stores 144. In various embodiments, in addition to providing various cloud-based data protection services, the disclosed data protection service 102 is operable to store the organization's backup data in a time-series data lake 120. As described above, data lake service 110 may store logical backups (rather than backup images) of an organization's data stores 144, enriched with metadata (e.g., timestamp information, access control information, data source identifiers, etc.), in a data lake 120 associated with the organization. In various embodiments, storing the enriched, time-series data in an organization's data lake 120 can be thought of as satisfying the "E" (extraction) and "L" (loading) functions of the ETL process, and retrieving a desired view of the backup data from the data lake 120 may be thought of as performing the "T" (transformation) function. In various embodiments, the disclosed data protection service 102 enables such "transformations"—retrieving a desired data view from an organization's backup data in a data lake 120—to be performed on-demand. By performing the "transformation" operations on-demand, the disclosed systems and methods may be thought of as changing the ordering of the operations from the traditional E-T-L to E-L-T. Further, since the transformation is being performed by the cloud-based data protection service 102, an organization may retrieve any number of views of its backup data without further burdening its production resources (e.g., hosts 140 or data stores 144).

Figure 6:
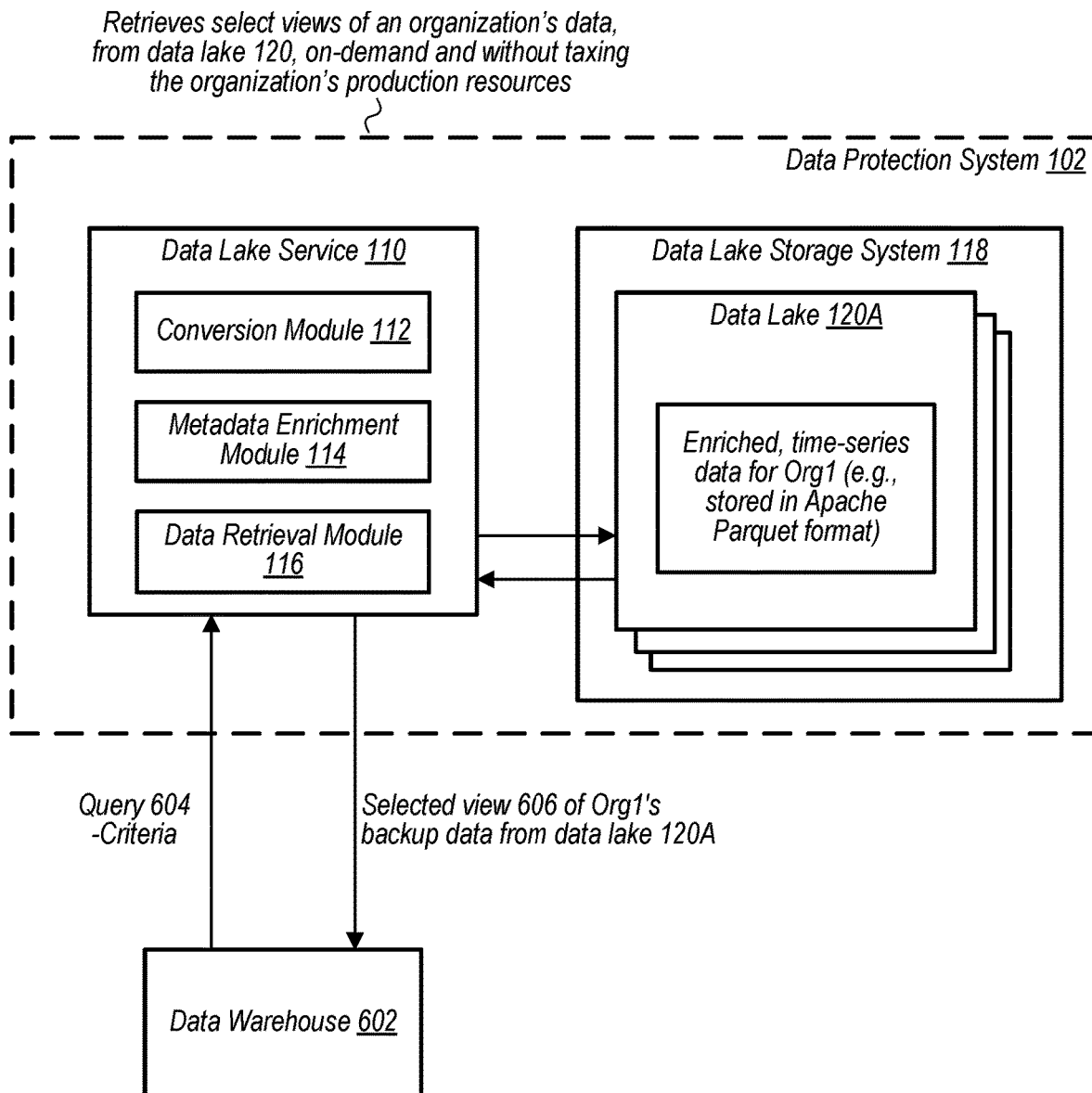
FIG. 6 is a block diagram illustrating an example data protection service that is operable to provide selected data views, from a time-series data lake, to a data warehousing system, according to some embodiments.

For example, in FIG. 6, block diagram 600 depicts an embodiment of data protection service 102 that is operable to retrieve selected views from the data lake 120 and provide those data views to a data warehouse 602, according to some embodiments. In various embodiments, storing an organization's enriched, time-series backup data in a data lake 120 facilitates efficient retrieval of select data views (e.g., from various data sources at any point(s) in time) of the backup data in a manner that does not further tax the organization's production resources. In the depicted embodiment, for example, data warehouse 602 sends a query 604 to data protection service 102 that includes one or more criteria for the desired data view. (Note that, in various embodiments, the query 604 may originate from some other requesting entity 160 rather than from the data warehouse 602 itself) In various embodiments, the query 604 may specify any suitable combination of criteria for a desired data view, such as a time period or periods, one or more points of time, one or more data sources, keywords, access control information, etc. In various embodiments, query 604 may be specified using any suitable database-access protocol. As one non-limiting example, query 604 may be specified using the ODBC protocol, which, as will be appreciated by one of skill in the art, is a common API used to access database management systems. In some embodiments, it may be desirable to utilize a common protocol, such as the ODBC protocol, to facilitate integration with common data science tools, such as Tableau™. By accepting queries using the ODBC protocol, the disclosed data lake service 110, in some embodiments, allows data scientists to provide queries directly from their existing analytics tools. Note, however, that this embodiment is provided merely as a non-limiting example and, in other embodiments, any suitable format may be used for query 604.

In various embodiments, once the data protection service 102 receives the query 604, it may be passed to the data retrieval module 116. As noted above, in various embodiments, data retrieval module 116 is operable to retrieve data from a data lake 120 for an organization. In the depicted embodiment, for example, data retrieval module 116 receives the query 604 and is operable to search the data lake 120 for data to be included in the desired data view. For example, in various embodiments, the data retrieval module 116 is operable to identify relevant data for the desired data view using the embedded metadata maintained, along with the backup data itself, in the data lake 120. As shown in FIG. 6, the data lake service 110 may then provide the desired data view to the data warehouse 602. Once the desired data view is received at the data warehouse 602, various data analytics tools may be used to further analyze the data, as desired. In various embodiments, this process of retrieving a desired data view across both data source- and time-dimensions can be performed on-demand and as-needed to facilitate continued analytical operations. Thus, in various embodiments, the disclosed time-series data lake 120 makes it possible to perform data transformations in an on-demand manner during the runtime, thereby eliminating much of the sunk costs in compute and storage typically incurred in traditional ETL workflows. Further, in various embodiments, the data retrieval module 116 (and, more generally, the data lake service 110) has access to elastic compute and storage resources, allowing the time-series data lake 120 to be used as a true scale-on-demand transformation layer for calling applications.

As a non-limiting example, the disclosed systems and methods, in some embodiments, are operable to retrieve the following data views from a data lake 120 in an on-demand manner that does not require the organization's production resources to perform additional ETL operations:

1. A view of all data in a data lake 120 for the entire time-series;
2. A view of all data in a data lake 120 for a selected time period in the time-series;
3. A view of all data in a data lake 120 for a selected point in time;
4. A view of data belonging to a specific data source 144 in a data lake 120 for the entire time-series;
5. A view of data belonging to a specific data source 144 in the data lake 120 for a selected time period in the time-series;
6. A view of data belonging to a specific data source 144 in the data lake 120 for a selected point in time;
7. A view of a subset of data from a specific data source 144 in the data lake 120 for the entire time-series;
8. A view of a subset of data from a specific data source 144 in the data lake 120 for a selected time period in the time-series;
9. A view of a subset of data from a specific data source 144 in the data lake 120 for a selected point in time;
10. A view of a union of subsets of data from any number of data sources 144 in the data lake 120 for the entire time-series;
11. A view of a union of subsets of data from any number of data sources 144 in the data lake 120 for a selected time period in the time-series; and
12. A view of a union of subsets of data from any number of data sources 144 in the data lake 120 for a selected point in time.

The disclosed systems and methods may provide various technical benefits, according to various embodiments. For example, in some embodiments, utilizing the data protection service 102 to retrieve desired data views from the data lake 120 in an on-demand manner allows an organization to avoid burdening its production resources (e.g., hosts 140, data stores 144, data storage devices 142, etc.) with computationally expensive and I/O-intensive ETL operations. Instead, by simply utilizing the data protection service 102 to perform its data backup operations for data protection and compliance purposes, the organization is also able to serve the same backup data (which, using prior backup services, would be stored as backup images) for operationally intensive data warehousing and analytics needs. Further, unlike traditional ETL operations, using the disclosed systems and methods, an organization has the flexibility to generate data views across both data source- and time-dimensions without the need to re-perform ETL operations on its production resources. For example, in various embodiments, the disclosed data lake service 110 may use an organization's enriched backup data stored in a data lake 120 to create data views from various time periods or points in time that include data from any number of the organization's data stores 144 that are backed up using the data lake service 110.

Referring now to FIG. 7, a flow diagram illustrating an example method 700 for providing requested data views to a data warehousing system is depicted, according to some embodiments. In various embodiments, method 700 may be performed by data protection service 102 of FIG. 1 to retrieve a particular view of backup data for a particular organization (e.g., Org1) from a data lake 120 (e.g., data lake 120A) in an on-demand manner for a requesting data warehouse 602. As noted above, in various embodiments, data protection service 102 may be implemented as a cloud-based service using public or private cloud-based computing resources, such as server computer systems. In some such embodiments, the server computer system(s) used to implement the data protection service 102 may include (or have access to) a non-transitory, computer-readable medium having program instructions stored thereon that are executable by the server computer system(s) to cause the operations described with reference to FIG. 7. In FIG. 7, method 700 includes elements 702-714. While these elements are shown in a particular order for ease of understanding, other orders may be used. In various embodiments, some of the method elements may be performed concurrently, in a different order than shown, or may be omitted. Additional method elements may also be performed as desired.

At 702, in the illustrated embodiment, the data protection service 102 provides a data lake service 110 that maintains, for a first organization, a time-series data lake 120A storing a time-series representation of backup data from a plurality of data sources associated with the first organization. In some embodiments, the time-series representation of the backup data includes metadata associated with the backup data. For example, for a given data element stored in the data lake 120, the metadata may indicate a particular data source from which the given data element originated and a time at which the given data element was backed up. At 704, in the illustrated embodiment, the data protection service 102 receives additional backup data associated with the first organization as part of one or more backup operations, where the additional backup data includes a first backup image, of a first data source, that was generated at a first point in time. For example, as described above with reference to FIGS. 1 and 3A, the data protection service 102 may receive a physical backup of one or more of Org1's data sources 144 as part of a backup operation.

At 706, in the illustrated embodiment, the data protection service 102 creates a first logical backup of the first data source using the first backup image. For example, as described above, conversion module 112 may convert a physical backup of a data store 144 from a format associated with that data store 144 into a logical backup of that data store. At 708, in the illustrated embodiment, the data protection service 102 stores the first logical backup, with corresponding metadata, in the time-series data lake as part of the backup data. For example, the data lake service 110 may store the first logical backup and its corresponding metadata (e.g., generated by metadata enrichment module 114) in data lake 120A maintained for the Org1.

At 710, in the illustrated embodiment, the data protection service 102 receives, from a data warehousing system, a first query specifying a particular data view of the backup data associated with the first organization. For example, as described above with reference to FIG. 6, data warehouse 602 may issue a query 604 containing one or more search criteria to the data protection service 102. As a non-limiting example, the first query may be specified using the ODBC protocol. At 712, in the illustrated embodiment, the data protection service 102 retrieves the particular data view from the time-series data lake based on the first query. For example, the data retrieval module 116 may use one or more of the criteria specified in the query 604 to parse the metadata in the data lake 120A to retrieve the selected view 606 of the Org1's backup data. At 714, in the illustrated embodiment, the data protection service 102 provides the particular data view to the data warehousing system. For example, the data lake service 110 may then send the selected view 606 of the Org1's data, from the data lake 120A, back to the data warehouse 602.

As noted above, the particular data view provided by the data protection service 102 to the data warehouse 602 will vary depending on the query 604 provided. For example, in some embodiments the particular data view may include a subset of the data from the first logical backup stored at 708. Further, in some embodiments, the particular data view may include data from two or more of the data sources associated with the Org1 (e.g., at a particular point in time specified by the first query, from a particular time period specified in the first query, etc.). In some embodiments, the particular data view may include data from each of the data stores 144 that the Org1 backs up using the data protection service 102, though, in other embodiments, the particular data view may include data from any subset of these data stores 144. In some embodiments, the query 604 may specify a particular data store 144 and the particular data view may include data from one or more backups of that particular data store 144 (e.g., over a particular time period, at a particular point in time, etc.).

Example Embodiments: Providing Data Views from a Time-Series Data Lake to a Data Warehousing System 1. A method, comprising:
   providing, by a cloud-based service, a data lake service that maintains, for a first organization, a time-series data lake storing a time-series representation of backup data from a plurality of data sources associated with the first organization;

receiving, by the cloud-based service, additional backup data associated with the first organization as part of one or more backup operations, wherein the additional backup data includes a first backup image, of a first data source, that was generated at a first point in time;

creating, by the cloud-based service, a first logical backup of the first data source using the first backup image;

storing, by the cloud-based service, the first logical backup, and corresponding metadata, in the time-series data lake as part of the backup data;

receiving, by the cloud-based service from a data warehousing system, a first query specifying a particular data view of the backup data associated with the first organization;

in response to the first query, retrieving, by the cloud-based service, the particular data view from the time-series data lake; and providing, by the cloud-based service, the particular data view to the data warehousing system.

2. The method of claim 1, wherein the particular data view includes first data that was extracted from the first logical backup of the first data source, and wherein the particular data view does not include all of the data from the first logical backup of the first data source.

3. The method of claim 1, wherein the time-series representation of the backup data includes metadata associated with the backup data, wherein, for a given data element of the backup data in the time-series data lake, the metadata indicates:
   a particular one of the plurality of data sources from which the given data element of the backup data originated; and
   a time at which the given data element of the backup data was backed up; and
   wherein the retrieving the particular data view includes parsing the metadata associated with the backup data based on one or more search criteria included in the first query.

4. The method of claim 1, wherein the plurality of data sources includes a subset of two or more data sources, wherein the particular data view includes data from each of the subset of two or more data sources associated with the first organization.

5. The method of claim 1, wherein the plurality of data sources includes a subset of two or more data sources, wherein the particular data view includes data from each of the subset of two or more data sources from a particular time period specified in the first query.

6. The method of claim 1, wherein the particular data view includes data from each of the plurality of data sources from a particular point in time specified in the first query.

7. The method of claim 1, wherein the particular data view includes an entirety of the backup data from a particular one of the plurality of data sources.

8. The method of claim 1, wherein the particular data view includes data from a particular data source, of the plurality of data sources, from a particular time period specified in the first query.

9. The method of claim 1, wherein the particular data view includes data from a particular data source, of the plurality of data sources, from a particular point in time specified in the first query.

10. A non-transitory, computer-readable medium having program instructions stored thereon that are executable by one or more computer systems to perform operations comprising:
    providing a cloud-based data lake service that maintains data for a plurality of organizations, wherein, for a first one of the plurality of organizations, the cloud-based data lake service maintains a time-series data lake that stores a time-series representation of backup data from a plurality of data sources associated with the first organization;
    receiving, from a data warehousing system, a first query specifying a particular data view of the backup data associated with the first organization;
    retrieving the particular data view from the time-series data lake based on the first query; and
    providing the particular data view to the data warehousing system.

11. The non-transitory, computer-readable medium of claim 10, wherein the particular data view includes first data that was extracted from a particular backup of a first one of the plurality of data sources, and wherein the particular data view does not include all of the data from the particular backup of the first data source.

12. The non-transitory, computer-readable medium of claim 10, wherein the time-series representation of the backup data includes metadata associated with the backup data, wherein, for a given data element of the backup data in the time-series data lake, the metadata indicates:
    a particular one of the plurality of data sources from which the given data element of the backup data originated; and
    a time at which the given data element of the backup data was backed up; and
    wherein the retrieving the particular data view includes parsing the metadata associated with the backup data based on one or more search criteria included in the first query.

13. The non-transitory, computer-readable medium of claim 10, wherein the particular data view includes a subset of data from a particular data source, of the plurality of data sources, across an entirety of the time-series.

14. A method, comprising:
    receiving, by a cloud-based service, backup data associated with an organization during one or more backup operations, wherein the backup data includes:
        a first physical backup, corresponding to a first data source, generated at a first point in time; and
        a second physical backup, corresponding to a second data source, generated at a second point in time, wherein the second data source is isolated from the first data source;
    converting, by the cloud-based service, the backup data from one or more physical backup formats, associated with the first and second data sources, into logical backup data;
    storing, by the cloud-based service, the logical backup data and corresponding metadata in a time-series data lake associated with the organization;
    receiving, by the cloud-based service from a data warehousing system, a request for a particular data view of the backup data associated with the organization;
    retrieving, by the cloud-based service, the particular data view from the time-series data lake; and
    providing, by the cloud-based service, the particular data view to the data warehousing system.

15. The method of claim 14, wherein the particular data view includes a subset of data from the first data source from a particular time period specified in the request.

16. The method of claim 14, wherein the particular data view includes a subset of data from the first data source at a particular point in time specified in the request.

17. The method of claim 14, wherein the particular data view includes a union of a first subset of data, from the first data source, and a second subset of data from the second data source.

18. The method of claim 14, wherein the particular data view includes a union of a first subset of data, from the first data source from a particular point in time, and a second subset of data from the second data source from the particular point in time.

19. The method of claim 14, wherein the particular data view includes a union of a first subset of data, from the first data source during a particular time period, and a second subset of data from the second data source during the particular time period.

20. The method of claim 14, wherein the request includes a first query specified, by the data warehousing system, using the Open Database Connectivity ("ODBC") protocol.

Data Preservation Using a Time-Series Data Lake

In various embodiments, the disclosed systems and methods may be used to perform long-term data retention for an organization utilizing a time-series data lake. Such embodiments may prove particularly useful, as one non-limiting example, to preserve data during a legal hold. A "legal hold" (also known as a "litigation hold") is a process in which an organization (e.g., in response to instructions from the organization's legal team) preserves electronically stored information ("ESI") and paper documents that may be relevant to a pending or anticipated legal matter. For ESI, the organization's data custodian may be asked to preserve relevant data for an indeterminate amount of time, until he or she is notified by the legal team that the legal matter is resolved or settled.

Complying with a legal hold request can present significant technical challenges. For example, as discussed above, organizations often store their production data in various (potentially disparate) data stores and, in many instances, this data is maintained in data silos. In such a configuration, some of the organization's data is kept isolated from, and thus not accessible to, other parts of the organization, making it more difficult for the organization to search its data stores to identify data relevant to the legal hold. Further, in addition to preserving relevant data in its production systems (e.g., data stores 144 of FIG. 1), an organization may have relevant data stored in backup systems that also needs to be preserved. To accomplish this, traditional backup systems, which store data in the form of backup images of the organization's data stores, typically use a "brute force" approach in which, to preserve relevant data contained in a backup image, these systems retain the entire backup image (potentially terabytes in size), even if only a small fraction of the data (e.g., megabytes in size) in the backup image is relevant to the legal hold. Further, these traditional backup systems may have to retain many such backups from several weeks, months, or years, depending on the scope and time-window of relevant data to be retained. This often results in such traditional backup systems storing large amounts of data for an indeterminate amount of time (e.g., months or years), given the open-ended nature of a legal hold.

In various embodiments, however, the disclosed systems and methods provide a technical solution to these technical problems. For example, in various embodiments, the disclosed data protection service 102 may be used to preserve a selected subset of data maintained in a data lake 120 for an organization. For example, in various embodiments, the cloud-based data protection service 102 is operable to perform data preservation (e.g., to comply with a legal hold request) of data stored in an organization's data lake 120 while avoiding the various technical shortcomings of traditional backup systems described above. For instance, unlike traditional backup systems in which a backup image of an entire data source (e.g., a database) is stored in a proprietary format (e.g., an RDS snapshot), the data protection service 102, as described above, transforms an organization's backup data into a logical, addressable format (e.g., Apache™ Parquet format) that is enriched with various metadata information, such as timestamp, access control, and data source information. When a data preservation request (e.g., a legal hold request) is then received, the data protection service 102 may be used to identify and store data from the data lake 120 that matches certain time, access control, or source criteria specified by the data preservation request.

Figure 8:
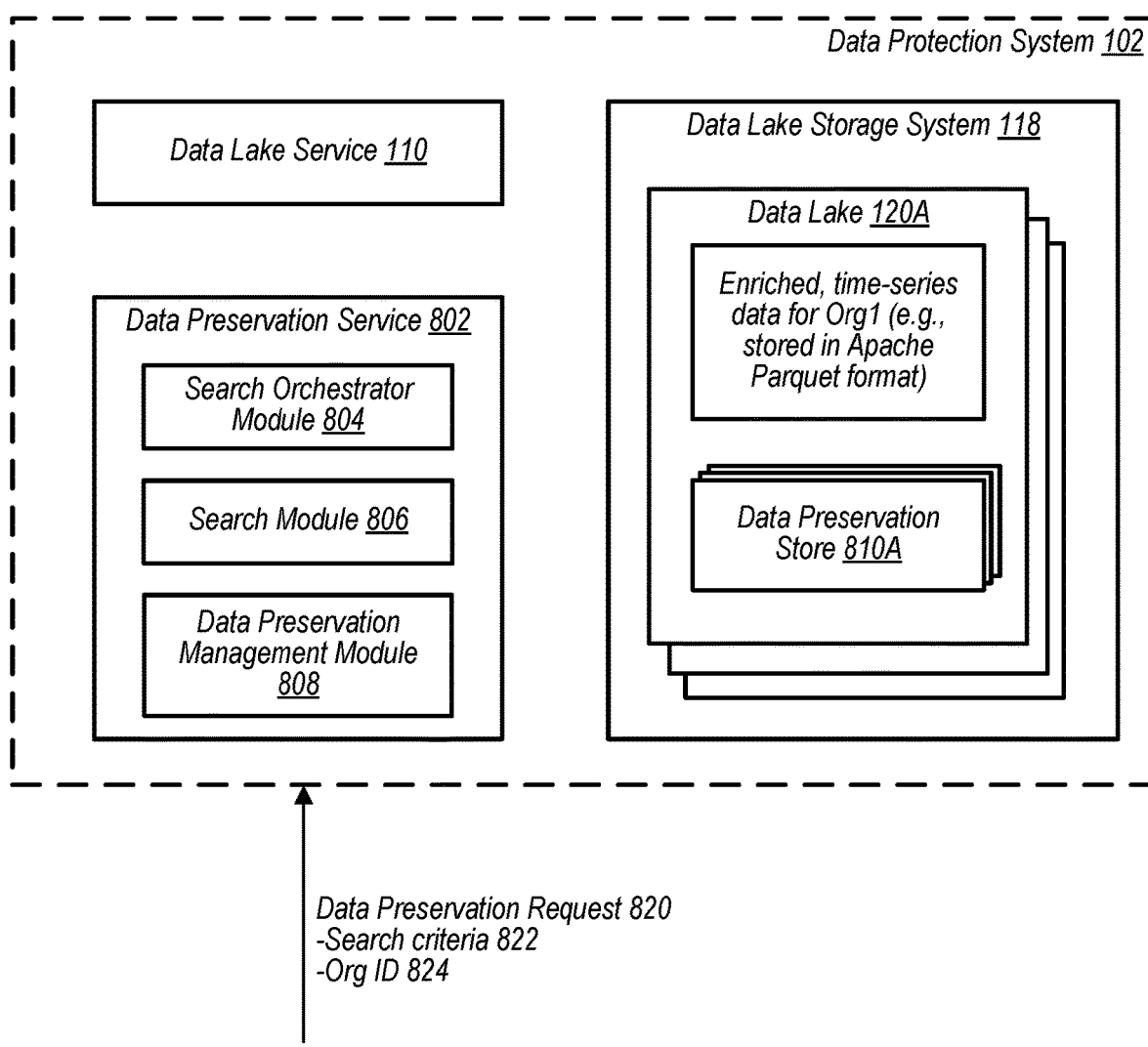
FIG. 8 is a block diagram illustrating an example data protection service that includes a data preservation service, according to some embodiments.

In FIG. 8, a block diagram 800 depicts an example embodiment of data protection service 102. In the depicted embodiment, the data protection service 102 includes a data preservation service 802 and data lake storage system 118, which, in turn, includes data lakes 120 for various organizations. In FIG. 8, data lake storage system 118 includes data lake 120A used to store backup data for Org1's various data stores 144 in a logical, addressable format that, as described in more detail above, is enriched with various items of metadata to facilitate improved access. In various embodiments, data preservation service 802 is operable to perform data preservation operations so as to identify and preserve subsets of data for an organization that are maintained in that organization's data lake 120. For example, as shown in FIG. 8, data protection service 102 may receive a data preservation request 820 that includes one or more search criteria 822 and an organization identifier 824. In various embodiments, data preservation service 802 is operable to identify data relevant to the data preservation request 820 based on the one or more search criteria 822 and the org ID 824. The data preservation service 802 may then preserve such data in a secure location for an indeterminate amount of time. For example, in some embodiments, the data preservation request 820 may be sent to the data protection service 102 in conjunction with a legal hold, for which a subset of an organization's backup data is to be preserved until a particular legal matter is resolved. In such embodiments, data preservation service 802 may use the one or more search criteria 822 to identify data relevant to the legal hold and store a copy of that data in a separate location where it may be preserved until the legal hold has been lifted. Note, however, that this embodiment is described merely as one non-limiting example and, in other embodiments, data preservation service 802 may be used to preserve selected subsets of an organization's data in any suitable context, as desired.

In the depicted embodiment, data preservation service 802 includes search orchestrator module 804, which, in various embodiments, is operable to request resources to run various tasks associated with performing data preservation operations. For example, in various embodiments, the search orchestrator module 804 operates in conjunction with a resource management module (not separately shown, for clarity) in the data protection service 102 to allocate resources to perform the various data preservation operations described herein. Additionally, in various embodiments, search orchestrator module 804 is operable to generate a tag value that may be used to uniquely identify the data preservation request 820 and a data preservation store 810 in which data deemed relevant to the data preservation request 820 will be stored. Search orchestrator module 804 may generate the tag value using any of various suitable techniques. In some embodiments for example, search orchestrator module 804 may generate an identifiable tag value based on requester's name, keywords identifying the litigation such as docket number or jurisdiction, and a timestamp at which data preservation request 820 was received. Further, in various embodiments, search orchestrator module 804 is operable to generate a unique key value using cryptographic methods where the seed is based on a custodian's identification credentials and a requester's identification credentials so that both the custodian and the requester need to sign off before the preserved data can be released from the litigation hold. As one non-limiting example, in some embodiments the search orchestrator module 804 may use one or more methods from the Java™ KeyGenerator class to generate one or more key values using any of various suitable cryptographic algorithms (e.g., AES, DES, HmacSHA256, etc.). In various embodiments, the search orchestrator module 804 is operable to generate multiple keys (e.g., two, three, five, etc.), one for each of multiple different users, and require multiple parties to demonstrate their agreement to deleting data from a data preservation store 810 by each providing their respective key. In some embodiments, a key value may be used to perform various authentication operations when a user attempts to access the data maintained in a data preservation store 810.

Data preservation service 802 further includes search module 806, which, in various embodiments, is operable to search a time-series data lake 120 to identify data that is relevant to a data preservation request 820. For example, in various embodiments, search module 806 may select the data lake 120 associated with the org ID 624. Further, based on the one or more search criteria 822, the search module 806 may construct and execute one or more queries against the selected data lake 120 to identify data relevant to the data preservation request 820. In various embodiments, search module 806 is operable to copy this identified data to a separate data preservation store 810. Note that, in various embodiments, the data relevant to a data preservation request 820 may include a subset (potentially a small subset) of the backup of a given data source 144 from a given point in time. Unlike traditional backup systems that would be required to retain an entire backup image simply to preserve a small subset of the data contained therein, the disclosed data preservation service 802 is instead able to preserve that data that is actually relevant to the data preservation request 820, saving data-storage resources and improving operation of the data protection service 102 as a whole.

Further note that, in various embodiments, a data preservation request 820 may be indefinite in duration due, for example, to the open-ended nature of legal holds. Accordingly, in various embodiments, data preservation service 802 may preserve relevant data in a data preservation store 810 until the data preservation service 802 receives a request from an authorized user (or from multiple authorized users in the form of multi-person sign-off) to release or delete the data from the data preservation store 810. Thus, in various embodiments, data preservation service 802 may retain data in the data preservation store 810 using a data retention policy that differs from the data retention policy of the data lake 120. For example, in some embodiments, an organization or the data protection service 102 may establish a data retention policy that dictates the duration for which data is maintained in a particular data lake 120. Though the data retention period for a given data lake 120 may be quite long (e.g., five years, 10 years, 15 years, etc.), it may still be unsuitable for use in a data preservation context. For example, a legal hold may be initiated years after relevant data has been stored in the data lake 120, and legal hold may last for an extended time (e.g. five years). If the data protection service 102 were to simply evict data from the data lake 120 based on its pre-existing data retention policy, it is possible that data relevant to the legal hold may be inadvertently deleted or otherwise lost. By identifying and copying data deemed relevant to the data preservation request 820, however, data preservation service 802 is able to maintain relevant data in a secure data preservation store 810 for an open ended period of time without risk of the relevant data being deleted according to the data retention policy of the data lake 120.

Data preservation service 802 further includes data preservation management module 808. In various embodiments, data preservation management module 808 is operable to create a dedicated data preservation store 810 for a given data preservation request 820. In some embodiments, for example, data preservation store 810 may be a dedicated sub-repository within the data lake 120 of the organization for which the data preservation operations are being performed. Note, however, that although the data preservation store 810 is part of the organization's data lake 120 in the depicted embodiment, this embodiment is provided merely as one non-limiting example. In other embodiments, data preservation service 802 may instead (or additionally) store data deemed relevant to the data preservation request 820 in any suitable format using any suitable (local or remote) data storage device. Additionally, in some embodiments, the data preservation store 810 may be hosted by a partnering application's data store that is purpose-build for specific applications (such as eDiscovery tools) and is fed on-demand by the data preservation service 802 using the organization's time-series data lake 120. Further, in various embodiments, data preservation management module 808 is operable to monitor new data as it is stored in the time-series data lake 120 (e.g., due to newer backups being performed) and, if the new data contains records that match the one or more search criteria 822, the data preservation service 802 is operable to automatically copy those data records into the data preservation store 810 that matches the tag-value and key-value associated with the data preservation request 820.

Figure 9:
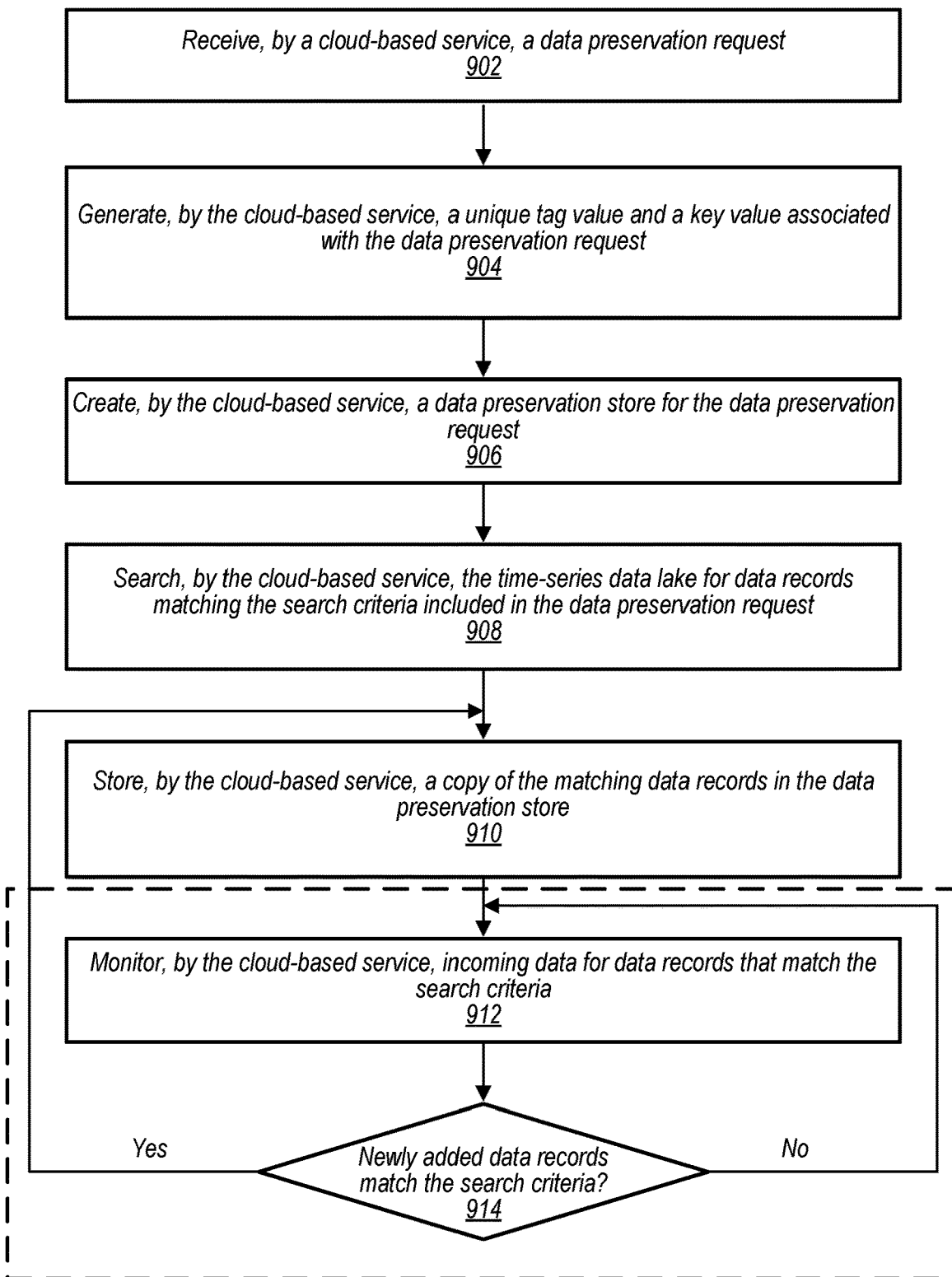
FIG. 9 is a flow diagram that illustrates an example method for preserving data from a time-series data lake, according to some embodiments.

Referring now to FIG. 9, a flow diagram illustrating an example method 900 for preserving data from a time-series data lake is depicted, according to some embodiments. In various embodiments, method 900 may be performed by data preservation service 802 of FIG. 8 to preserve a subset of data for an organization (such as Org1) for an indeterminate amount of time to comply with a data preservation request (e.g., a legal hold). As noted above, in various embodiments, data protection service 102 (and, thus, data preservation service 802) may be implemented as a cloud-based service using public or private cloud-based computing resources, such as server computer systems. In some such embodiments, the server computer system(s) used to implement the data preservation service 802 may include (or have access to) a non-transitory, computer-readable medium having program instructions stored thereon that are executable by the server computer system(s) to cause the operations described with reference to FIG. 9. In FIG. 9, method 900 includes elements 902-914. While these elements are shown in a particular order for ease of understanding, other orders may be used. In various embodiments, some of the method elements may be performed concurrently, in a different order than shown, or may be omitted. Additional method elements may also be performed as desired.

At 902, in the illustrated embodiment, the data preservation service 802 receives a data preservation request 820. As discussed above, in some embodiments, the data preservation request 820 may be issued in conjunction with a legal hold in which a subset of an organization's backup data must be preserved for an indefinite period of time (e.g., until the underlying legal matter has been resolved). In various embodiments, the data preservation request 820 includes various search criteria, such as a relevant time period, keywords, user identifiers, data source identifiers, access control information, geographical information, or any other criteria suitable to identify data relevant to the data preservation request.

At 904, in the illustrated embodiment, the data preservation service 802 generates a tag value and key-value associated with the data preservation request. For example, as described above, in some embodiments the search orchestrator module 804 is operable to generate a tag value that may be used to uniquely identify the data preservation request 820 and the data preservation store 810 in which data matching the search criteria 822 included in the data preservation request 820 is to be preserved. Additionally, in various embodiments, the search orchestrator module 804 is operable to generate the key value that may be used to perform authentication operations prior to providing a requesting user with access to the data in the data preservation store 810. For example, in some embodiments, when a user requests access to the data contained in the data preservation store 810, data preservation service 802 may first require that the requesting user provide both the unique tag value and the key value so that the data preservation service 802 may both identify the requested data preservation store 810 and verify that the requesting user is authorized to access the data contained therein.

At 906, and the illustrated embodiment, the data preservation service 802 establishes a data preservation store 810 in which to store data that are deemed to match the search criteria identified in the data preservation request 820. In some embodiments, the search orchestrator module 804 may pass information associated with the data preservation request 820, such as the tag value or an identifier associated with the data preservation request 820, to the data preservation management module 808, which may then set up a new data preservation store 810. For example, in various embodiments, once the data preservation service 802 receives the data preservation request 820, the data preservation management module 808 may allocate a new data preservation store 810 within the data lake 120 of the relevant organization (e.g., Org1, in the current example). In some such embodiments, the data preservation store 810 is a dedicated sub-repository that may be used to store a copy of the data deemed relevant to the data preservation request 820.

At 908, in the illustrated embodiment, the data preservation service 802 searches the time-series data lake 120 for data matching the search criteria included in the data preservation request. For example, in various embodiments, search module 806 is operable to parse the organization's entire time-series data lake 120 to search for data records that are relevant to the data preservation request 820 (e.g., by querying the time-series data lake 120A based on one or more search criteria 822 specified in the data preservation request 820). At 910, in the illustrated embodiment, the data preservation service 802 stores a copy of the matching data records in the data preservation store 810. As non-limiting examples, note that, in various embodiments, the matching data records may include a subset of data from a backup of a particular data source, all of the data from a backup of a particular data source, data from multiple different data sources, data from backups performed at different time periods from a single data source or multiple different data sources (e.g., data from a backup of data source 144A performed at time $t_1$ and data from a backup of data source 144B performed at time $t_2$).

At 912, in the illustrated embodiment, the data preservation service 802 monitors incoming data for data records that match the search criteria 822. For example, in various embodiments, the data preservation management module 808 is operable to monitor incoming data streams into the data lake 120. As new backup data is stored in the time-series data lake 120 (due to new backup operations), the data preservation service 802 is operable, at element 914, to determine whether any of these newly added data records are relevant to the data preservation request 820. If so, method 900 proceeds to element 910, in which the records are copied into the data preservation store 810 associated with the data preservation request 820. If, however, there are no newly added data records that are relevant to the data preservation request, method 900 continues to element 912, in which it continues to monitor the incoming data records. Note that, in some embodiments, the monitoring of element 912 may be performed "inline" as data streams are arriving at the data protection service 102, the data lake 120, or the data preservation service 802, for example through inline processing and filtering to harvest records matching search criteria. In other embodiments, however, the monitoring may be implemented as a post-process operation, for example by batch processing and filtering at periodic intervals to harvest records matching search criteria.

As indicated in FIG. 9, elements 912-914 may be repeated (at any desired frequency, which may be specified by the organization, the data protection system, a data custodian, the issuer of the legal hold request, etc.) until the data preservation service 802 receives a notification that the data preservation request 820 has been lifted. At such time, the data preservation service 802 may release (or actively delete, in some embodiments) the data in the data preservation store 810. In various embodiments, once the data preservation service 802 has deleted the data from the data preservation store 810, it may generate a report verifying the deletion and provide this report to one or more users (e.g., a data custodian for the organization, an issuer of the data preservation request 820, etc.). Further note that, in various embodiments, data preservation service 802 is operable to manage multiple different data-preservation jobs for a given organization (e.g., Org1) and for multiple different organizations at a given time. For example, in embodiments in which data protection service 102 stores data associated with a first organization (Org1), a second organization (Org2), and a third organization (Org3), the data preservation service 802 may perform one or more (simultaneous or otherwise overlapping) data-preservation jobs for one or more of Org1, Org2, and Org3.

Example Embodiments: Data Preservation Using a Time-Series Data Lake

1. A method, comprising:
    maintaining, by a cloud-based service, a time-series data lake that includes, for an organization, a time-series representation of a plurality of data sources, wherein the time-series data lake retains data according to a first retention policy;
    receiving, by the cloud-based service, a request for a subset of data associated with the organization;
    retrieving, by the cloud-based service, the subset of data from the time-series data lake; and
    storing, by the cloud-based service, the subset of data in a particular storage location that retains data according to a second, different retention policy.
2. The method of claim 1, wherein the subset of data includes first data from a backup of a first one of the plurality of data sources, wherein the subset of data does not include all of the data from the backup of the first data source.
3. The method of claim 1, wherein the retrieving includes:
    querying, by the cloud-based service, the time-series data lake based on one or more search criteria specified in the request for the subset of data.
4. The method of claim 1, wherein the particular storage location is a dedicated sub-repository within the time-series data lake.
5. The method of claim 1, further comprising:
    maintaining, by the cloud-based service, backup data for the organization, wherein the time-series representation of the plurality of data sources is generated based on the backup data for the organization.
6. The method of claim 1, wherein the request for the subset of data includes one or more search criteria.
7. The method of claim 6, wherein the one or more search criteria include at least one of a data source identifier, a time identifier, or an access control identifier.
8. The method of claim 1, further comprising:
    subsequent to the storing the subset of data in the particular storage location, receiving, by the cloud-based service, updated backup data for the organization; and
    storing, by the cloud-based service, the updated backup data in the time-series data lake.
9. The method of claim 1, further comprising:
    subsequent to the storing the subset of data in the particular storage location, monitoring, by the cloud-based service, updated backup data added to the time-series data lake to determine whether any of the updated backup data matches one or more search criteria specified in the request for the subset of data.
10. A non-transitory, computer-readable medium having program instructions stored thereon that are executable by one or more computer systems to perform operations comprising:
    accessing a time-series data lake that includes, for an organization, a time-series representation of a plurality of data sources, wherein the time-series data lake retains data according to a first retention policy;

receiving a request for a subset of data associated with the organization;
retrieving the subset of data from the time-series data lake; and
storing the subset of data in a particular storage location that retains data according to a second, different retention policy.

11. The non-transitory, computer-readable medium of claim 10, wherein the retrieving the subset of data includes executing a query against the time-series data lake at a first point in time, wherein the subset of data includes data that matches the query at the first point in time.

12. The non-transitory, computer-readable medium of claim 10, wherein the operations further comprise:
subsequent to the storing the subset of data in the particular storage location, receiving updated backup data for the organization;
storing the updated backup data in the time-series data lake; and
monitoring the updated backup data in the time-series data lake to determine whether any of the updated backup data matches one or more search criteria included in the request for the subset of data.

13. The non-transitory, computer-readable medium of claim 12, wherein the operations further comprise:
receiving information identifying a frequency with which the time-series data lake is to be monitored for data matching the one or more search criteria, wherein the monitoring is performed periodically based on the identified frequency.

14. The non-transitory, computer-readable medium of claim 12, wherein the monitoring includes querying the time-series data lake for data that was added to the time-series data lake subsequent to a first point in time at which the subset of data was retrieved from the time-series data lake.

15. The non-transitory, computer-readable medium of claim 12, wherein the operations further comprise:
based on the monitoring, identifying a second subset of data associated with the organization that matches the one or more search criteria; and
storing the second subset of data in the particular storage location.

16. A method, comprising:
providing, by a cloud-based service, a data lake service that maintains data for a plurality of organizations, wherein, for a first one of the plurality of organizations, the data lake service maintains a time-series data lake that stores a time-series representation of data associated with the first organization according to a first retention policy;
receiving, by the cloud-based service from a requesting entity, a request to preserve backup data associated with the first organization that matches one or more search criteria; and
storing, by the cloud-based service, a subset of data that matches the one or more search criteria in a particular storage location, wherein the particular storage location that retains data according to a second, different retention policy.

17. The method of claim 16, wherein, based on the second, different retention policy, the cloud-based service retains data in the particular storage location until a second request is received, from one or more authorized users, to release the subset of data.

18. The method of claim 16, further comprising:
encrypting, by the cloud-based service, the subset of data to generate an encrypted subset of data, wherein the storing includes storing the encrypted subset of data in the particular storage location.

19. The method of claim 16, further comprising:
generating, by the cloud-based service, for the subset of data, a tag value that is usable to identify the subset of data that matches the one or more search criteria; and
wherein the storing the subset of data includes storing the tag value in the particular storage location with the subset of data.

20. The method of claim 16, further comprising:
subsequent to the storing, receiving, by the cloud-based service from a requesting user, a subsequent request to access the subset of data;
initiating, by the cloud-based service, one or more authentication operations for the requesting user; and
in response to the requesting user satisfying the one or more authentication operations, providing, by the cloud-based service, the subset of data to the requesting user.

Modification of Data in a Time-Series Data Lake

In various embodiments, in addition to performing data retention operations described above with reference to FIGS. 8-9, the disclosed systems and methods may be used to modify specific data items within an organization's backup data maintained in the data lake 120. For example, organizations are often required to protect growing volumes of personal and sensitive data and to adhere to various data privacy regulations, such as the General Data Protection Regulation ("GDPR") and the California Consumer Privacy Act ("CCPA"). Adhering to such data privacy regulations can present various technical challenges. For example, complying with "Right to Be Forgotten" requests (in which an individual (e.g., in an EU member nation) requests that an organization modify (e.g., delete, mask, anonymized, etc.) some or all of the data about the individual that the organization maintains) can be particularly difficult.

For traditional image-based backup systems that store data in the form of backup images of an entire system or data source, deleting the relevant information—even if it is just a small fraction of the overall backup image—is a time-intensive and computationally expensive task that requires deleting the entire backup image or copying the data to a new image where the information "to be forgotten" may be deleted. Since backup images in these traditional backup systems are typically preserved for an extended period of time (e.g. years), complying with a "Right to Be Forgotten" request is a burdensome and resource-intensive operation even for a single request from a data subject (e.g., a user, group of users, customer, employee, or any other individual(s) or entities for which an organization may maintain data). Additionally, in many instances, deleting an entire backup image is simply not possible. For example, an organization may need to retain the remainder of the data in that backup image for business continuity and recovery purposes. In some instances, some types of data needs be preserved for regulatory compliance. Further, in some instances, the regulations that provide the "Right to Be Forgotten" may have one or more exception clauses. As a non-limiting example, the CCPA provides that information does not need to be deleted if it is necessary to "protect against malicious, deceptive, fraudulent, or illegal activity." Another non-limiting example is a legal hold in which data must be preserved pending an on-going legal matter, even if a data subject whose data is subject to the legal hold has requested deletion of his or her data.

Figure 10:
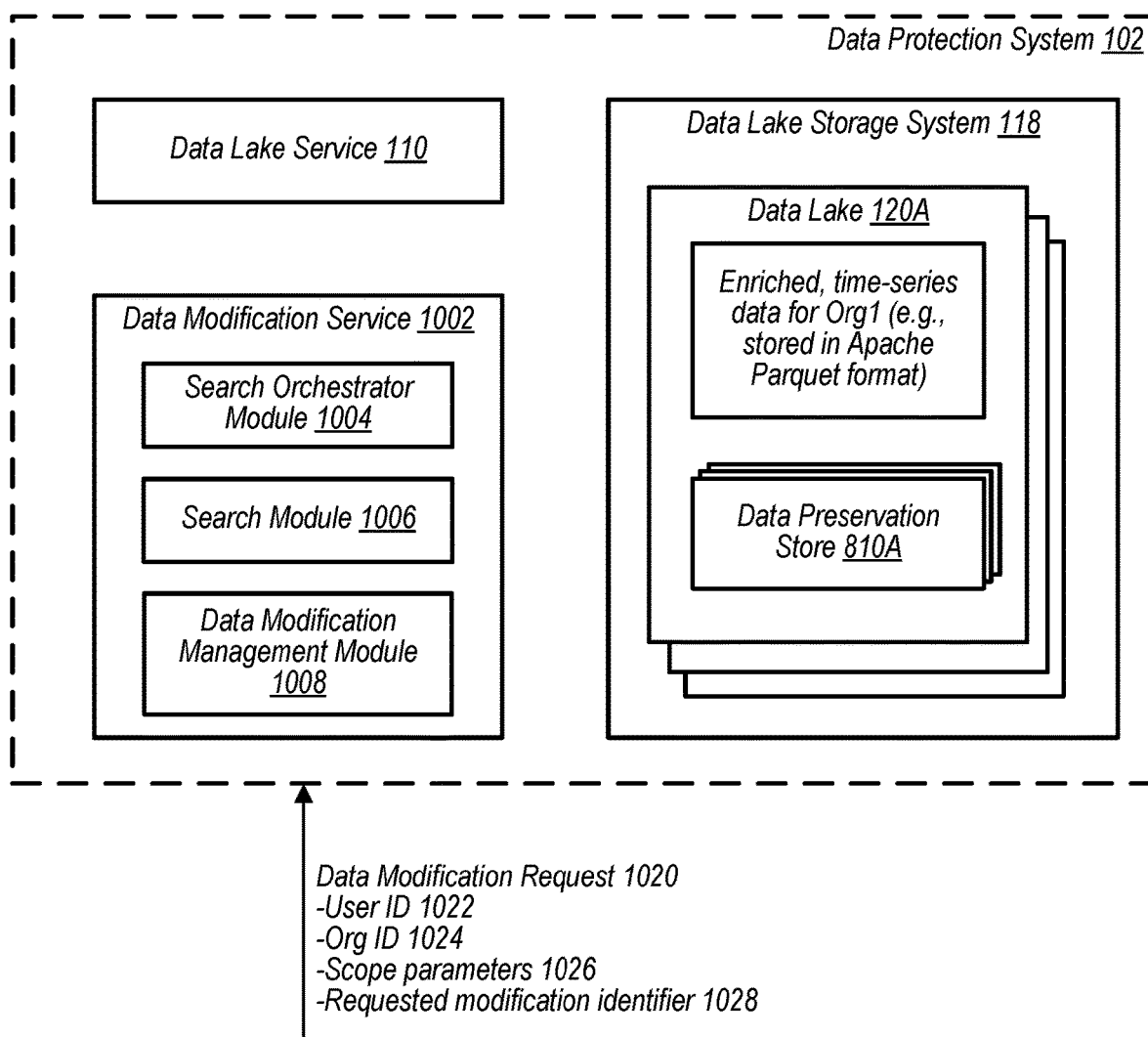
FIG. 10 is a block diagram illustrating an example data protection service that includes a data modification service, according to some embodiments.

In various embodiments, the disclosed systems and methods address these technical shortcomings of prior image-based backup systems, thereby improving the process of modifying (e.g., deleting) data maintained in a backup system. For example, in FIG. 10, block diagram 1000 depicts an example embodiment of a data protection service 102, which includes a data modification service 1002 and data lake storage system 118. In various embodiments, data modification service 1002 is operable to identify data associated with a requesting user (a data subject) that is maintained in a data lake 120 in a precise or "surgical" manner and perform the requested modification on that user's data in a way that avoids the various technical problems of traditional image-based backup systems. For example, as shown in FIG. 10, data protection service 102 may receive a data modification request 1020, which may include various items of information. In the depicted embodiment, the data modification request 1020 includes a user ID 1022 identifying a data subject requesting his or her data to be modified, an organization ID 1024 identifying the organization with which the data subject is associated, a scope parameter 1026 indicating the scope of the user's data to be modified, and a requested modification identifier 1028 identifying the modification(s) the data subject wishes to make to his or her data. In some embodiments, the scope parameter 1026 may be used to limit the modification criteria based on metadata such as timestamps, access control lists, tags associated with the objects, file system-level permissions, record-level security (if applicable), the nature or classification of each column, object-level timestamps, file- or record-level checksum or hashed fingerprints, etc. Note, however, that this embodiment is provided merely as one non-limiting example and, in other embodiments, additional or fewer items of information may be included in a given data modification request 1020. Further note that, in various embodiments, rather than submitting the data modification request 1020 his or herself, the data subject may instead submit a "Right to Be Forgotten" request to an organization (e.g., Org1) that maintains data associated with the user. After receiving such a request, that organization may create and send data modification request 1020 to the data protection service 102.

In the depicted embodiment, data modification service 1002 includes search orchestrator module 1004, which, in various embodiments, is operable to request resources to run various tasks associated with performing data modification operations. For example, in various embodiments, search orchestrator module 1004 operates in conjunction with a resource management module (not shown separately, for clarity) in the data protection service 102 to allocate resources to perform the various data modification operations described herein. Additionally, in various embodiments, search orchestrator module 1004 is operable to generate a tag value that may be used to uniquely identify the data modification request 1020. Further, in various embodiments, search orchestrator module 1004 is operable to generate a unique key value using cryptographic methods where the seed is based on users' credentials or privileges, where the key value may be used perform various authentication operations when a user attempts various actions, such as status checks, auditing, and reporting status of the data modification request 1020. In various embodiments, search orchestrator module 1004 may generate key values and tag values using any of various suitable techniques, including those described above with reference to search orchestrator module 804 of FIG. 8.

Data modification service 1002 further includes search module 1006, which, in various embodiments, is operable to search a time-series data lake 120 to identify data deemed relevant to the data modification request 1020. For example, in various embodiments, search module 1006 may select the data lake 120 associated with the org ID 1024, as that is the data lake 120 that includes data associated with the data subject. In various embodiments, search module 1006 is operable to identify and fetch all data relevant to the data subject associated with the user ID 1022. (Note that, in embodiments in which the data modification request 1020 is provided for a group of users, the request 1020 may include multiple user ID's 1022 associated with the various data subjects included in the group.) For example, in various embodiments, search module 1006 may parse the data in the data lake 120 to locate records matching the criteria associated with the data modification request 1020, such as the user ID 1022, time window for information, access control information, source information, or any other suitable search parameters (which may be specified in the data modification request 1020). Note that, in various embodiments, since the organization's (Org1, in the current example) backup data is stored in the data lake 120 enriched with various items of metadata, the search module 1006 is operable to quickly search the entire data lake 120A for data records that match the data modification request 1020. In various embodiments, after identifying data relevant to the data modification request 1020, the data modification service 1002 may store the relevant data in a data preservation store 810 (discussed above) for "staging," so that one or more users (such as the data subject or one or more users associated with the relevant organization) may review the data prior to performing the requested modification.

Data modification service 1002 further includes data modification management module 1008. In various embodiments, once the relevant data has been identified, data modification management module 1008 is operable to generate a report that includes information indicative of the relevant data. As a non-limiting example, the report may include a sample of the data records that match the "Right to Be Forgotten" request criteria, information indicating the data source 144 from which the data records originated, timestamp information associated with the data records, or any other suitable items of information. In various embodiments, such a report may be provided to one or more users associated with the organization (e.g., Org1) for approval prior to performing the requested modification on the relevant data.

In various embodiments, if the requested modification is approved by the appropriate users of the organization, the data modification service 1002 may perform the requested modification identified by the requested modification identifier 1028 of the data modification request 1020. In some embodiments, the requested modification may include erasing all data records matching the "Right to Be Forgotten" criteria, which would result in a deletion of the data records from the data lake 120. In other embodiments, the requested action may include masking some or all of the data records matching the "Right to Be Forgotten" criteria. In some such embodiments, this process includes masking data values in the relevant records with predefined default values while maintaining the structure of the data records themselves. As a non-limiting example, masking data record may include replacing one or more items of the data subject's personally identifiable information (e.g., name, residence address, phone number, etc.) with predetermined default values (e.g., "John Doe," [null], 1-111-1111, etc.). Further, in some embodiments, the requested modification may include anonymizing all data records matching the "Right to Be Forgotten" criteria. In some such embodiments, this process masks just the personally identifiable information related to the data subject. In various embodiments, the disclosed data modification service 1002 is capable of performing these modifications in a "surgical" and precise manner due, in part, to the way in which the data lake service 110 converts an organization's backup data from a backup image to a logical backup and enriches the logical data with various items of metadata before storing it in a data lake 120, as described above with reference to FIGS. 1-4.

In various embodiments, the data modification service 1002 may then pass the requested action to a policy manager (not separately shown, for clarity) in the data protection service 102 to secure resources from a resource management module, which may register and queue the request for execution. The data modification service 1002 may then return the tag value and key value associated with the data modification request 1020 to one or more users associated with the organization (e.g., a data custodian). In various embodiments, this tag value and key value may be used for status checks, auditing, and reporting.

In some embodiments, prior to performing the requested modification, the data modification service 1002 may contact the data preservation service 802 (described above with reference to FIG. 8) to determine whether there are records deemed relevant to the data modification request 1020 that are also subject to an on-going data preservation request 820. If so, in various embodiments, those records are identified and excluded from the requested data modification so as to avoid deleting or modifying data that is otherwise subject to a data preservation request. In some such embodiments, the determination of whether to modify or preserve a data subject's data may be delegated to a user (e.g., the organization's data custodian) in the event of a conflict between a data preservation request 820 and a data modification request 1020. Note that, in some embodiments, the data preservation requests 820 and the data modification requests 1020 may both be defined by one or more search criteria or one or more scope parameters, or both. In various embodiments, if the data modification service 1002 or data preservation service 802 detects an overlap in search criteria or scope parameter(s) between a data preservation request 820 and a data modification request 1020, the preservation operation may take precedence of the data-modification request in accordance with applicable laws or regulations (e.g., California's CCPA). As noted above, the applicable data privacy regulations may vary depending on the jurisdiction in which an organization resides or operates. Accordingly, in some embodiments, the disclosed techniques include utilizing a policy engine to resolve conflicts between data preservation requests 820 and data modification requests 1020 based on the relevant organization's jurisdiction and applicable data privacy regulations, for example by comparing the requirements of the applicable data privacy regulation(s) to the conflicting data preservation request 820 to determine whether one or more items of data must be preserved (per the data preservation request 820) despite the receipt of a data modification request 1020.

In various embodiments, the data modification service 1002 may then perform the requested data-modification operation on the matching data records using the resources allocated by the resource management module. Once the requested action has been performed, the data modification service 1002 may then provide notification to one or more users, such as the data custodian of the relevant organization or the data subject.

Note that, in various embodiments, the data modification service 1002 is operable to continue monitoring incoming data streams into the data lake 120. As new data is stored in the data lake 120 (due to newer backups), the data modification service 1002 may determine whether any of these newly added records are relevant to any previously issued data modification requests 1020. If so, the data modification service 1002 may automatically flag these data records (and, optionally, store them in a data preservation store 810) so that the requested modification may be performed on these data records as well. Note that, in some embodiments, the data modification service 1002 is operable to perform this monitoring "inline" as data streams are arriving at the data protection service 102, the data lake 120, or the data modification service 1002, for example through inline processing and filtering to harvest records matching search criteria. In other embodiments, however, the data modification service 1002 may implement the monitoring as a post-process operation, for example by batch processing and filtering at periodic intervals to harvest records matching search criteria.

Referring now to FIG. 11, a flow diagram illustrating an example method 1100 for modifying data in a time-series data lake is depicted, according to some embodiments. In various embodiments, method 1100 may be performed by data modification service 1002 of FIG. 10 to modify (e.g., delete, mask, anonymize, etc.) data associated with a data subject (e.g., a user of the service provided by an organization) As noted above, in various embodiments, data protection service 102 (and, thus, data modification service 1002) is implemented as a cloud-based service using public or private cloud-based computing resources such as server computer systems. In some such embodiments, the server computer system(s) used to implement the data modification service 1002 may include (or have access to) a non-transitory, computer-readable medium having program instructions stored thereon that are executable by the server computer system(s) to cause the operations described with reference to FIG. 11. In FIG. 11, method 1100 includes elements 1102-1108. While these elements are shown in a particular order for ease of understanding, other orders may be used. In various embodiments, some of the method elements may be performed concurrently, in a different order than shown, or may be omitted. Additional method elements may also be performed as desired.

At 1102, in the illustrated embodiment, the data protection service 102 maintains a data lake 120 that includes, for the first organization, a time-series representation of data from a plurality of data sources 144 associated with the organization. At 1104, in the illustrated embodiment, the data protection service 102 receives a request 1020 (e.g., corresponding to a "Right to Be Forgotten" request) to modify data associated with a first user of the first organization. In various embodiments, the request 1020 may include one or more items of information, such as one or more search parameters or an indication of one or more modifications to be performed. For example, in the embodiment of FIG. 10, the data modification request 1020 includes a user ID 1022, an org ID 1024, scope parameters 1026, and a requested modification identifier 1028. Note, however, that this embodiment is provided nearly as one non-limiting example.

At 1106, in the illustrated embodiment, the data modification service 1002 searches the data lake 120 to identify a subset of data associated with the first user that matches the one or more search parameters. For example, since, in various embodiments, the backup data stored in data lake 120 is enriched with one or more items of metadata, the search module 1006 may use the criteria provided in the request 1020 to parse the metadata in the data lake 120, enabling the search module 1006 to efficiently identify the subset of data that is associated with the first user and that matches the one or more search parameters. At 1108, in the illustrated embodiment, the data modification service 1002 performs one or more modifications on the subset of data that matches the one or more search parameters. As noted above, performing these one or more modifications may include deleting some or all of the subset of data, masking some or all of the subset of data, anonymizing some or all of the subset of data, etc. For example, in instances in which the subset of data includes one or more items of personal information (e.g., name, residence, contact information, SSN, email address, etc.), element 1108 may include modifying one or more items of personal information, for example by replacing at least one item of the personal information with a corresponding default value. Further note that, in various embodiments, the data modification service 1002 may perform different modifications on different portions of the subset of data. For example, in some embodiments, the data modification service 1002 may delete all data records associated with the user that include personally identifiable information (such as the data subject's name, Social Security number, etc.) while simply masking or anonymizing other data records associated with the user.

Note that, in some embodiments, the data modification service 1002 may perform various operations prior to performing the one or more modifications at 1108. For example, in some embodiments, prior to performing the one or more modifications, the data modification service 1002 may store the subset of data in a particular storage location (e.g., data preservation store 810) that retains data according to a second retention policy that is different from a first retention policy used by the time-series data lake 120 for the organization. In some such embodiments, the data modification service 1002 may then provide the user (e.g., the requesting user) with access to the subset of data in the particular storage area for the user's review. Further, in some embodiments, prior to performing the one or more modifications, the data modification service 1002 may verify that the subset of data is not subject to a data preservation request associated with the organization. Additionally, in some embodiments, prior to performing the one or more modifications, the data modification service 1002 may generate a report corresponding to the subset of data, where the report may include various items of information about the subset of data, such as the data sources from which the subset of data was retrieved, timeline information, sample data records, etc. The data modification service 1002 may then provide this report to one or more users for approval prior to performing the one or more operations on the identified subset of data.

Further, in some embodiments, subsequent to performing the one or more modifications on the subset of data, the data modification service 1002 may monitor updated backup data associated with the organization (e.g., before, as, or after that backup data is stored in the time-series data lake 120) to determine whether any of the updated backup data matches the one or more search parameters included in the data modification request 1020. If any of the updated backup data does match the data modification request 1020, the data modification service 1002 may automatically flag these data records (and, optionally, store them in a data preservation store 810) so that the requested modification(s) may also be performed on this data.

Example Embodiments: Modification of Data in a Time-Series Data Lake

1. A method, comprising:
   maintaining, by a cloud-based service, a time-series data lake that includes, for an organization, a time-series representation of data from a plurality of data sources;
   receiving, by the cloud-based service, a request to modify data associated with a user of the organization, wherein the request includes:
   one or more search parameters; and
   an indication of one or more modifications to be performed;
   parsing, by the cloud-based service, the time-series data lake to identify a subset of data that matches the one or more search parameters; and
   performing, by the cloud-based service, the one or more modifications on the subset of data in the time-series data lake.
2. The method of claim 1, wherein the performing the one or more modifications includes deleting at least a portion of the subset of data from the time-series data lake.
3. The method of claim 1, wherein the subset of data associated with the user includes one or more items of personal information, and wherein the performing the one or more modifications includes modifying the one or more items of personal information within the subset of data.
4. The method of claim 3, wherein the one or more items of personal information includes at least one of a name of the user, a residence of the user, and contact information associated with the user.
5. The method of claim 3, wherein the modifying the one or more items of personal information includes replacing the one or more items of personal information with one or more corresponding default values.
6. The method of claim 1, wherein the performing the one or more modifications includes masking one or more values of data records included in the subset of data.
7. The method of claim 1, wherein the time-series data lake retains data according to a first retention policy, the method further comprising:
   prior to the performing the one or more modifications, storing, by the cloud-based service, the subset of data in a particular storage location that retains data according to a second, different retention policy; and
   providing, by the cloud-based service, the user with access to the subset of data in the particular storage location for review.
8. The method of claim 1, further comprising:
   prior to the performing the one or more modifications, verifying, by the cloud-based service, that the subset of data is not subject to a data preservation request associated with the organization.
9. The method of claim 1, further comprising:
   subsequent to the performing the one or more modifications on the subset of data, receiving, by the cloud-based service, updated backup data for the organization;
   storing, by the cloud-based service, the updated backup data in the time-series data lake; and monitoring, by the cloud-based service, the updated backup data in the time-series data lake to determine whether any of the updated backup data matches the one or more search parameters.

10. The method of claim 1, further comprising:
prior to the performing the one or more modifications, generating, by the cloud-based service, a report that includes information corresponding to the subset of data that matches the one or more search parameters; and
providing, by the cloud-based service, the report to one or more users for approval prior to the performing the one or more modifications.

11. A non-transitory, computer-readable medium having program instructions stored thereon that are executable by a computer system to perform operations comprising:
accessing a time-series data lake that includes, for an organization, a time-series representation of data from a plurality of data sources;
receiving a request to modify data associated with a user of the organization, wherein the request includes:
one or more search parameters; and
an indication of one or more modifications to be performed;
parsing the time-series data lake to identify a subset of data that matches the one or more search parameters; and
performing the one or more modifications on the subset of data in the time-series data lake.

12. The non-transitory, computer-readable medium of claim 11, wherein the performing the one or more modifications includes deleting at least a portion of the subset of data from the time-series data lake.

13. The non-transitory, computer-readable medium of claim 11, wherein the performing the one or more modifications includes masking one or more values of data records included in the subset of data.

14. The non-transitory, computer-readable medium of claim 11, wherein the time-series data lake retains data according to a first retention policy, wherein the operations further comprise:
prior to the performing the one or more modifications, storing the subset of data in a particular storage location that retains data according to a second, different retention policy; and
providing the user with access to the subset of data in the particular storage location for review.

15. The non-transitory, computer-readable medium of claim 11, wherein the operations further comprise:
prior to the performing the one or more modifications, verifying that the subset of data is not subject to a data preservation request associated with the organization.

16. A system, comprising:
at least one processor;
a non-transitory, computer-readable medium having instructions stored thereon that are executable by the at least one processor to cause the system to:
access a time-series data lake that includes, for an organization, a time-series representation of data from a plurality of data sources;
receive a request to modify data associated with a user of the organization, wherein the request includes:
one or more search parameters; and
an indication of one or more modifications to be performed;
parse the time-series data lake to identify a subset of data that matches the one or more search parameters; and
perform the one or more modifications on the subset of data in the time-series data lake.

17. The system of claim 16, wherein the subset of data associated with the user includes one or more items of personal information, and wherein, to perform the one or more modifications, the instructions are further executable by the at least one processor to cause the system to modify the one or more items of personal information within the subset of data.

18. The system of claim 17, wherein, to perform the one or more modifications, the instructions are further executable by the at least one processor to cause the system to replace the one or more items of personal information with one or more corresponding default values.

19. The system of claim 16, wherein the instructions are further executable by the at least one processor to cause the system to:
in response to receiving updated backup data for the organization, store the updated backup data in the time-series data lake; and
monitor the updated backup data in the time-series data lake to determine whether any of the updated backup data matches the one or more search parameters.

20. The system of claim 16, wherein the instructions are further executable by the at least one processor to cause the system to:
prior to performing the one or more modifications, generate a report that includes information corresponding to the subset of data that matches the one or more search parameters; and
provide the report to one or more users for approval prior to the performing the one or more modifications.

Example Computer System

Figure 12:
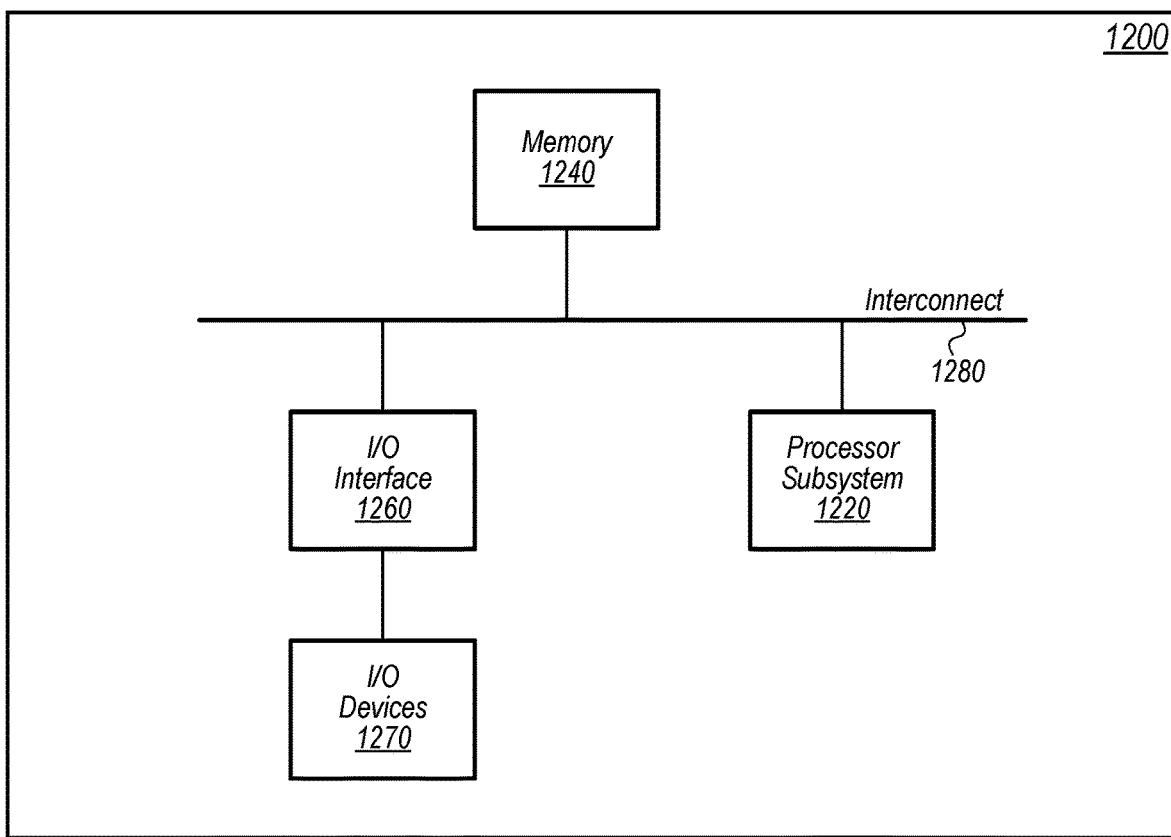
FIG. 12 is a block diagram illustrating an example computer system, according to some embodiments.

Referring now to FIG. 12, a block diagram of an example computer system 1200 is depicted, which may implement one or more computer systems, such as one or more cloud-based server computer systems used to implement the data protection service 102 of FIG. 1, according to various embodiments. Computer system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computer system 1200 may be any of various types of devices, including, but not limited to, a server computer system, personal computer system, desktop computer, laptop or notebook computer, mainframe computer system, server computer system operating in a datacenter facility, workstation, network computer, etc. Although a single computer system 1200 is shown in FIG. 12 for convenience, computer system 1200 may also be implemented as two or more computer systems operating together.

Processor subsystem 1220 may include one or more processors or processing units. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause system 1200 perform various operations described herein. System memory 1240 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as system memory 1240. Rather, computer system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over WiFi, Bluetooth, Ethernet, etc.), and computer system 1200 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments described herein are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: Claim 3 (could depend from any of claims 1-2); claim 4 (any preceding claim); claim 5 (claim 4), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—"[entity] configured to [perform one or more tasks]"—is used herein to refer to structure (i.e., something physical). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for [performing a function]" construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

In this disclosure, various "modules" operable to perform designated functions are shown in the figures and described in detail (e.g., conversion module 112, metadata enrichment module 114, data retrieval module 116, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

What is claimed is:

1. A method, comprising:
providing, by a cloud-based service, a data lake service that maintains, for a first organization, a time-series data lake storing a time-series representation of backup data from a plurality of data sources associated with the first organization;
receiving, by the cloud-based service, additional backup data associated with the first organization as part of one or more backup operations, wherein the additional backup data includes a first backup image, of a first data source, that was generated at a first point in time;
creating, by the cloud-based service, a first logical backup of the first data source using the first backup image, wherein the creating includes extracting backup data from the first backup image and enhancing the extracted backup data with both;
 backup metadata included in a given physical backup image, including schema information for a given data source; and
 additional metadata that was not included in the given physical backup image;
storing, by the cloud-based service, the first logical backup, and corresponding metadata, in the time-series data lake as part of the backup data;
receiving, by the cloud-based service from a data warehousing system, a first query specifying a particular data view of the backup data associated with the first organization;
in response to the first query, retrieving, by the cloud-based service, the particular data view from the time-series data lake over a time interval specified by the first query, wherein the retrieving is performed based on the additional metadata and the backup metadata, including the schema information for multiple data sources, and retrieves matching data, from multiple different data sources with different source schemas and from multiple backups of at least one data source; and
providing, by the cloud-based service, the particular data view to the data warehousing system.

2. The method of claim 1, wherein the particular data view includes first data that was extracted from the first logical backup of the first data source, and wherein the particular data view does not include all of the data from the first logical backup of the first data source.

3. The method of claim 1, wherein, for a given data element of the backup data in the time-series data lake, the additional metadata further indicates:
a particular one of the plurality of data sources from which the given data element of the backup data originated; and
a time at which the given data element of the backup data was backed up; and
wherein the retrieving the particular data view includes parsing metadata associated with the backup data based on one or more search criteria included in the first query.

4. The method of claim 1, wherein the plurality of data sources includes a subset of two or more data sources, wherein the particular data view includes data from each of the subset of two or more data sources associated with the first organization.

5. The method of claim 1, wherein the plurality of data sources includes a subset of two or more data sources, wherein the particular data view includes data from each of the subset of two or more data sources from a particular time period specified in the first query.

6. The method of claim 1, wherein the particular data view includes data from each of the plurality of data sources from a particular point in time specified in the first query.

7. The method of claim 1, wherein the particular data view includes an entirety of the backup data from a particular one of the plurality of data sources.

8. The method of claim 1, wherein the particular data view includes data from a particular data source, of the plurality of data sources, from a particular time period specified in the first query.

9. The method of claim 1, wherein the particular data view includes data from a particular data source, of the plurality of data sources, from a particular point in time specified in the first query.

10. A non-transitory, computer-readable medium having program instructions stored thereon that are executable by one or more computer systems to perform operations comprising:
   providing a cloud-based data lake service that maintains data for a plurality of organizations, wherein, for a first one of the plurality of organizations, the cloud-based data lake service maintains a time-series data lake that stores a time-series representation of backup data from a plurality of data sources associated with the first organization;
   receiving additional backup data associated with the first organization as part of one or more backup operations, wherein the additional backup data includes a first backup image, of a first data source, that was generated at a first point in time;
   creating a first logical backup of a first data source using a first backup image, wherein the creating includes extracting backup data from the first backup image and enhancing the extracted backup data with both:
      backup metadata included in a given physical backup image, including schema information for a given data source; and
      additional metadata that was not included in the given physical backup image;
   storing the first logical backup, and corresponding metadata, in the time-series data lake as part of the backup data;
   receiving, from a data warehousing system, a first query specifying a particular data view of the backup data associated with the first organization;
   in response to the first query, retrieving the particular data view from the time-series data lake over a time interval specified by the first query, wherein the retrieving is performed based on the additional metadata and the backup metadata, including the schema information for multiple data sources, and retrieves matching data, from multiple different data sources with different source schemas and from multiple backups of at least one data source; and
   providing the particular data view to the data warehousing system.

11. The non-transitory, computer-readable medium of claim 10, wherein the particular data view includes first data that was extracted from a particular backup of a first one of the plurality of data sources, and wherein the particular data view does not include all of the data from the particular backup of the first data source.

12. The non-transitory, computer-readable medium of claim 10, wherein the additional metadata further indicates for a given data element:
   a particular one of the plurality of data sources from which the given data element of the backup data originated; and
   a time at which the given data element of the backup data was backed up; and
   wherein the retrieving the particular data view includes parsing metadata associated with the backup data based on one or more search criteria included in the first query.

13. The non-transitory, computer-readable medium of claim 10, wherein the particular data view includes a subset of data from a particular data source, of the plurality of data sources, across an entirety of the time-series.

* * * * *